(12) United States Patent
Wang et al.

(10) Patent No.: US 7,954,078 B1
(45) Date of Patent: May 31, 2011

(54) HIGH LEVEL IC DESIGN WITH POWER SPECIFICATION AND POWER SOURCE HIERARCHY

(75) Inventors: Qi Wang, San Jose, CA (US); Pinhong Chen, Saratoga, CA (US); Mitchell W. Hines, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 207 days.

(21) Appl. No.: 11/771,953

(22) Filed: Jun. 29, 2007

(51) Int. Cl.
*G06F 17/50* (2006.01)
(52) U.S. Cl. ........ 716/127; 716/106; 716/109; 716/111; 716/120; 716/133
(58) Field of Classification Search .................. 716/1, 4, 716/106, 109, 110, 111, 120, 126, 127, 132, 716/133
See application file for complete search history.

(56) References Cited

U.S. PATENT DOCUMENTS

| | | | |
|---|---|---|---|
| 6,779,163 B2 | | 8/2004 | Bednar et al. |
| 6,820,240 B2 | | 11/2004 | Bednar et al. |
| 6,883,152 B2 | | 4/2005 | Bednar et al. |
| 2004/0172232 A1 | * | 9/2004 | Roy et al. ......................... 703/18 |
| 2008/0276105 A1 | * | 11/2008 | Hoberman et al. ........... 713/300 |

OTHER PUBLICATIONS

"Unified Power Format (UPF) Standard—Version 1.0", by Accellera, Version 1.0, Feb. 22, 2007, http://www.unifiedpowerformat.com/images/UPF.v1.0_Standard.pdf.*

* cited by examiner

*Primary Examiner* — Paul Dinh
*Assistant Examiner* — Nha T Nguyen
(74) *Attorney, Agent, or Firm* — Schwegman, Lundberg & Woessner, P.A.

(57) ABSTRACT

A method to produce an information structure in computer readable memory that specifies power source hierarchy information for an RTL circuit design that includes multiple function instances encoded in computer readable memory, comprising: providing associations within the memory between respective function instances of the RTL design and respective power domains so as to define respective primary power domains relative to the RTL design; specifying in the memory respective secondary power domains; and providing associations within the memory that are indicative of respective power source relationships between respective primary power domains and corresponding respective secondary power domains.

16 Claims, 13 Drawing Sheets

HIGH LEVEL IC DESIGN WITH POWER SPECIFICATION AND POWER SOURCE HIERARCHY

CROSS REFERENCE TO RELATED APPLICATIONS

The subject matter of this patent application is related to the subject matter of commonly owned U.S. patent application Ser. No. 11/590,657, filed Oct. 30, 2006, entitled, Method and Mechanism for Implementing Electronic Designs Having Power Information Specifications, which is expressly incorporated herein by this reference.

BACKGROUND OF THE INVENTION

1. Field of the Invention

The invention relates in general to designing of integrated circuits, and more particularly, to incorporation of power related information in more abstract higher level circuit designs and to the use of such power information during different stages of an IC design process.

2. Description of the Related Art

There is a growing need for enhanced power management capability in electronic devices, especially in battery-operated portable wireless devices such as cell phones, for example. Power management typically involves minimizing overall power consumption among different device functions. The intricacies of power management increase with the number and complexity of device functions.

Power management capabilities typically are built into a circuit design. Techniques to design-in power consumption management in an integrated circuit (IC) design include minimization of leakage and dynamic power dissipation, design of efficient packaging and cooling systems and verification of functionality or power shut-off sequences early in the IC design process. Efficient power consumption may become an integrated circuit design criterion that is almost as critical as timing and area, particularly for portable consumer electronics, for example.

Modern electronic design typically is performed with computer aided design (CAD) tools or electronic design automation (EDA) systems. To design an integrated circuit, a designer first creates a high level behavioral description of an IC device using a high-level hardware design language (HDL). Typically, an HDL is used to express a register transfer level (RTL) description of a design that describes a circuit in terms of a sequence of transfers of data. The word 'register' refers to the fact that in a circuit undergoing design, such transfers ultimately will occur between storage elements such as registers, for example. VHDL and Verilog, are examples of some of the more popular HDLs. An RTL description, for instance, may describe a circuit as a collection of registers, Boolean equations, control logic such as "if-then-else" statements as well as complex event sequences. An RTL description may describe functionality of a set of interconnected modules of varied complexity, from simple logic gates to full blown multipliers, for example. Moreover, a logic gate abstraction level description sometimes is provided as part of an RTL specification, for IP blocks, for example. An RTL specification provides instructions to EDA systems, for example, to produce a gate-level netlist and then, through additional design implementation stages, a physical design. The design process typically involves both functional design and verification and physical design and verification.

In the past, power optimization techniques typically have been applied at the physical implementation phase of the design. Certain advanced power management techniques such as multiple power domains with power shut-off (PSO) methodology ordinarily have been implemented at the physical level (i.e., post synthesis). These advanced power management design techniques can significantly influence the design intent. Yet, ordinarily, intended power management behavior is not readily captured in an RTL description of a circuit design. This can result in a gap in the RTL to physical level implementation and verification flow where the original RTL is no longer reliable and cannot be used to verify the final netlist implementation containing the advanced power management techniques. In other words, if an RTL description does not adequately encompass power management requirements, it is not readily feasible to check a final netlist against its original corresponding RTL design, since the addition of power management circuitry, during physical implementation, for example, may change the design in ways that make the RTL description an unreliable indicator of whether the final netlist actually comports with original design intent.

In addition, these specialized power management techniques at the physical implementation stage generally cannot be used by EDA tools at other stages of the design process, and therefore, cannot be used by EDA tools at an earlier RTL or gate level stage of the IC design process to perform, for example, functional verification. One reason this is important is that verification of low power designs only at the physical implementation stage of the design process may not capture all potential design flaws within the IC, particularly potential sequence-related problems for power modes that would be more aptly tested at a functional stage of the IC design process.

Furthermore, incorporation of power shut off capability into a functional design as a power saving mechanism, for example, can influence functional behavior of a circuit design. For instance, an original design expressed in an HDL implicitly assumes an uninterrupted source of power. However, the addition of a power-shut-off capability to select portions of a design may undermine that assumption since the shut-off of power in one part of a circuit design may impact the function of other portions of the design.

Thus, there has been a need for an improved approach for designing electronic circuits with specialized power management requirements. There also has been a need to capture at a high level design abstraction, the relationship between power shut-off capability and functional behavior of a circuit and to use that relationship to ensure that design intent can be carried through from an RTL description to physical implementation, for example. The present invention meets these needs.

SUMMARY OF THE INVENTION

In one aspect a method is provided to produce an information structure in computer readable memory that specifies power source hierarchy information for an RTL circuit design that includes multiple function instances encoded in computer readable memory. Associations are provided within the memory between respective function instances of the RTL design and respective primary power domains. Primary power domains are defined, at least in part, based upon their associations with function instances of the RTL specification. One or more secondary power domains are defined. Associations are provided within the memory between primary power domains and secondary power domains so as to indicate power source relationships between such defined power domains and associated secondary power domains, in which a secondary power domain is a power source for its associated one or more primary power domains.

BRIEF DESCRIPTION OF THE DRAWINGS

The aforementioned features and advantages of the invention, as well as additional features and advantages thereof, will be more clearly understandable after reading detailed descriptions of embodiments of the invention in conjunction with the following drawings.

DETAILED DESCRIPTION OF THE PREFERRED EMBODIMENTS

Figure 1:
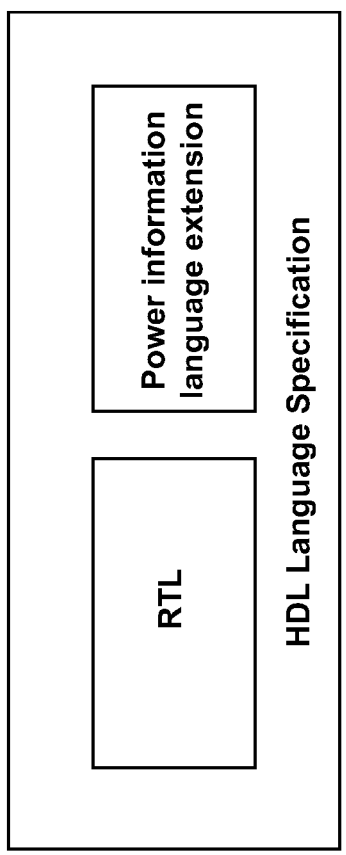
FIG. 1 is an illustrative drawing representing a power information file in a format implemented as a language extension for an HDL in accordance with some embodiments of the invention.

The following description is presented to enable any person skilled in the art to make and use a method and apparatus to incorporate power control circuitry design information in a high level circuit design and to use that information at different stages of a circuit design process, in accordance with embodiments of the invention, and is provided in the context of particular applications and their requirements. Various modifications to the preferred embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and processes are shown in block diagram form in order not to obscure the description of the invention with unnecessary detail. Thus, the present invention is not intended to be limited to the embodiments shown, but is to be accorded the widest scope consistent with the principles and features disclosed herein.

Overview of Power-Related Information Specified in Relation to an HDL Description of an Integrated Circuit Design In accordance with some embodiments of the invention, a power information file format, sometimes referred to herein as a "common power format" (CPF), is used to capture power-related design information such as one or more of, power-related design intent information, power-related power constraints, or power-related technology information for an integrated circuit design. A power information file format may be integrated into an existing HDL, or may be maintained as a separate file. The file format may be accessed and used by EDA tools throughout an EDA flow to design and verify the integrated circuit design. In other words, in some embodiments, an entire design flow including stages such as, verification, validation, synthesis, test, physical synthesis, routing, analysis and signoff, can reference and utilize power-related design information provided in a common power format.

Power-related design intent information is a category of information that identifies the power-related design intent for different portions of the IC design. Different portions of the design having similar intended attributes can be collected together into groupings called "power domains." In some embodiment, each power domain can be individually managed to achieve power management goals established for that power domain. Examples of such management techniques that can be applied to a power domain include the ability to power up or down a particular power domain as a group or specification of a given voltage level for the design blocks within a power domain.

Further, design intent information may include different power-related operating characteristics of the design portions within the IC design. For example, there may be many different intended modes of operation for the IC design, with each mode of operation having a different set of power-related characteristics. For instance, consider an IC design having three power domains, PD_a, PD_b, and PD_c. In a first mode of operation all three power domains may be active, for example. In a second mode of operation, power domain PD_a may be switched off or asleep to save power, but the other two power domains PD_b and PD_c are both active. In a third mode of operation, both PD_a and PD_b may be active but operated at a lower voltage to save power, but PD_c may be shut off to further reduce the power dissipation of the design. As is evident, there may be many variations of operating characteristics for the different power modes. For example, there may be different power-related sequences of operations for the IC design, in which different on/off sequences exist for the different power modes.

Power-related constraint information is a category of information that provides directives to guide optimization and analysis of the IC design. Examples of such power-related constraint information include:

Dynamic or leakage power constraints, e.g., maximum threshold dynamic or leakage at chip or module levels IR drop limit constraints, e.g., maximum IR drop limit for a power switch Electromigration (EM) constraints, e.g., maximum EM thresholds Saturation current constraints, e.g., saturation current limits for a power switch Leakage current constraints, e.g., leakage current for a power switch Timing constraints, e.g., elapsed time or cycle time constraints to power up or down or timing constraints for multi-mode and multi-corner analysis (for at least three cases: (i) single mode, single corner; (ii) multi-mode, single corner, (iii) multi-mode, multi-corner)

Power-related technology information generally comprises a library of technology and design blocks to represent specific devices that may be used to implement the IC design. In some embodiments, the technology design library includes a library of technology for implementing power-related IC designs. The following are examples of library cells that can be used in some embodiments of the invention:

An always on cell typically comprises a buffer or latch or flop located in a powered down domain, and whose secondary power pin is connected to a power supply that is continuously on even when the main power supply for the rest of the logic in the power domain is off.

An isolation cell comprises logic ordinarily used to isolate signals between two power domains when one is powered on and one is powered down. The most common use of such a cell is to isolate signals originating in a power domain that is being powered down, to the power domain that receives these signals and that remains powered on.

A level shifter cell comprises logic to pass data signals between power domains operating at different voltages.

A power switch cell comprises logic used to selectively connect and disconnect a power supply from gates in a power domain.

A state retention cell comprises circuitry such as a flip-flop or latch used to retain the state of the cell when its main power supply is shut off.

Figure 2:
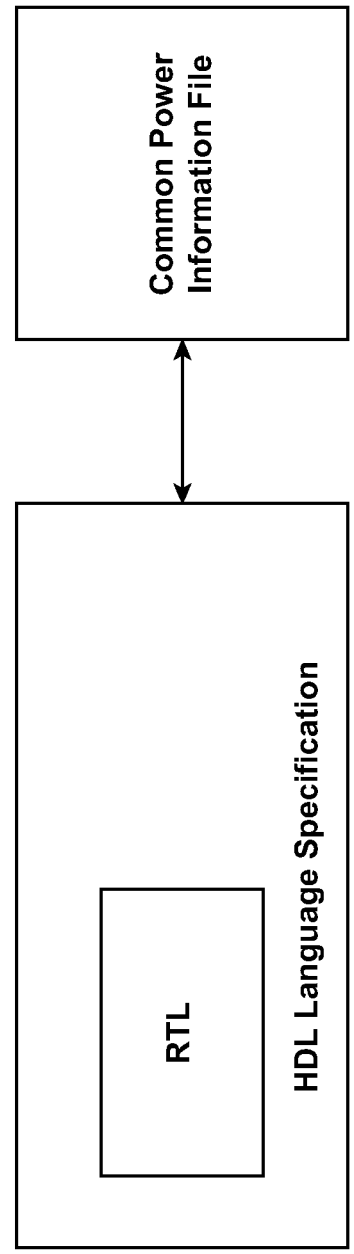
FIG. 2 is an illustrative drawing representing a power information file in a format implemented separate from a corresponding HDL file format in accordance with some embodiments of the invention.

There are numerous ways to implement a power information file format to express power-related design information at RTL. FIG. 1 is an illustrative drawing representing a file format implemented as a language extension for an HDL. In this approach, language constructs pertaining to power-related information are added to extend the base functionality of an HDL such as Verilog or VHDL, for example. FIG. 2 is an illustrative drawing representing a power information file format implemented as a file format separate from an HDL file format. As such, the power information is contained in a separate file from the HDL file.

RTL power-related design information in accordance with embodiments of the invention can be used to support the ability to specify that certain portions of a circuit can be individually powered on or off separately from other portions of the circuit. One reason for such power shut-off behavior is to minimize leakage power by making sure that portions of the design that are not needed at any given moment in time can be shut down.

In addition, the RTL power-related information can be used to specify that certain portions of an IC design operate at different voltage levels relative to other portions of the design. In this way, non-critical blocks or design blocks that do not require higher voltage can be implemented at lower voltage levels, thereby minimizing dynamic power consumed by an IC.

Power-related information provided in accordance with some embodiments of the invention is provided in a format that supports specification of multiple power domains, with each power domain potentially having different operating characteristics and voltage levels from other power domains. Power domains at different voltage levels can be tied to different voltage rails. Level shifters can be specified to shift voltage levels up or down between different power domains that are at different voltage levels. Different power modes can be configured that specify which power domains are active and which are inactive under various different conditions. A switch can be specified to turn on or off the flow of power to a particular power domain. Multiple power modes can be configured to provide numerous variations in the different combinations of power domains that are on or off at any given moment in time. Transition information can be specified to identify the conditions under which one power mode changes to another power mode. Transitions may be specified using Boolean expressions. Sequence information may be used to identify the order of legal or valid transitions.

In some embodiments, a power information file format can be implemented hierarchically. For example, different design teams can contribute to different blocks in the design. These blocks, whether they are soft blocks or hard blocks (such as IP instances, where the internal details of the block are unknown) can each have their own power information files.

Figure 3:
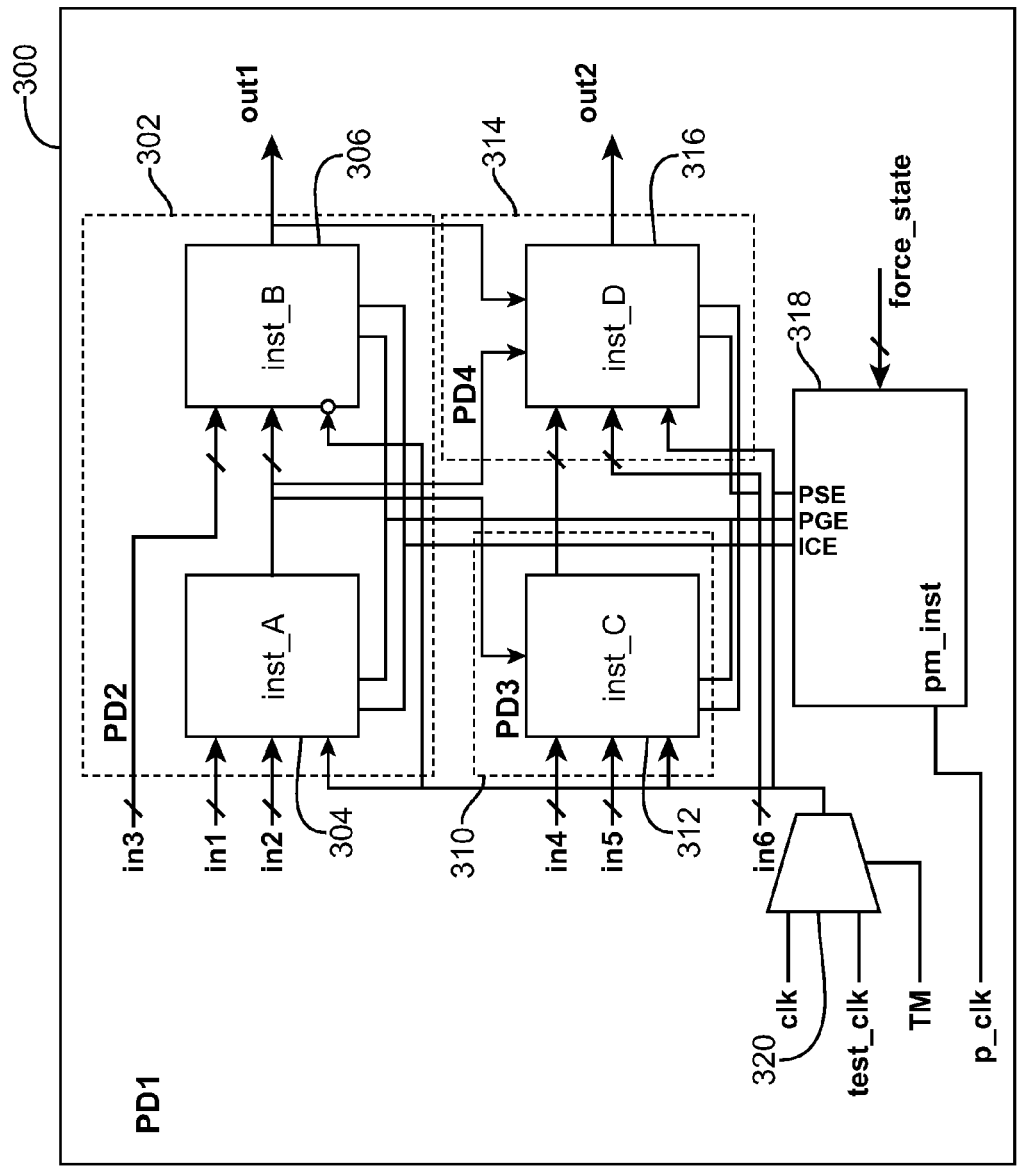
FIG. 3 is an illustrative block diagram representation of a first example design that implements power-related design information according to some embodiments of the invention.

FIG. 3 is an illustrative block diagram representation of a first example design that implements power-related design information according to some embodiments of the invention. This example top-level design 300 (also referred to as "top design") includes four logic function instances inst_A 304, inst_B 306, inst_C 312, and inst_D 316, a power manager instance pm_inst 318, and a clock gating logic 320. The term "instance" is used to denote a discrete portion of an overall RTL design. An instance may include one or more behaviors, operations or sets of operations at the RTL abstraction level or one or more logic gates or macros at a logic abstraction level. The term "function" is used to denote that the instance is part of the functional behavior specified by the RTL dosing, as contrasted with power control behavior. In this example, each function instance includes a set of input and output signals. The clock gating logic 320 receives inputs clk and test_clk, and a control signal TM. The output of the clock gating logic controls the gating of the clocks to instances inst_A 304, inst_B 306, inst_C 312, and inst_D 316, respectively.

As shown in FIG. 3, the example design includes four power domains. Individual power domains are defined relative to the function instances encompassed by such individual power domains. The "top design" and the power manager instance pm_inst 318 belong to the default power domain PD1 300. Function instances inst_A 304 and inst_B 306 belong to the power domain PD2 302. Function instance inst_C 312 belongs to power domain PD3 310. Function instance inst_D 316 belongs to power domain PD4 314. Table 1 shows illustrative static behavior of the four domains according of the example design.

TABLE 1

| | Power Mode | | | |
|---|---|---|---|---|
| Power Domain | PM1 | PM2 | PM3 | PM4 |
| PD1 | ON | ON | ON | ON |
| PD2 | ON | OFF | OFF | OFF |
| PD3 | ON | ON | OFF | OFF |
| PD4 | ON | ON | ON | OFF |

The power manager instance (pm_inst) 318 generates three sets of power control signals, namely pse_enable, pge_enable, and ice_enable, to control each power domain. Table 2 shows illustrative power control signals of the power manager instance pm_inst 318 for controlling the four power domains of the example design.

TABLE 2

| | Power Control Signals | | |
|---|---|---|---|
| Power Domain | power switch enable (PSE) | isolation cell enable (ICE) | power gating enable (PGE) |
| PD1 | no control signal | no control signal | no control signal |
| PD2 | pse_enable[0] | ice_enable[0] | pge_enable[0] |
| PD3 | pse_enable[1] | ice_enable[1] | pge_enable[1] |
| PD4 | pse_enable[2] | ice_enable[2] | pge_enable[2] |

The following Table 3 provides an example RTL power-related information file listing for the "top design" of FIG. 3 presented in a common power format (CPF) in accordance with some embodiments of the invention. The power-related information listing is encoded in computer readable storage that can be accessed by EDA tools involved with simulation, verification, synthesis and/or physical design, for example. The encoding set forth in Table 3 comprises an information structure that corresponds to the power-related design of FIG. 3. The encoding specifies power domains in relation to function instances (i.e. inst_A, inst_B, inst_C and inst_D) from an RTL design specification (not shown). The encoding also specifies power-control related behavior such, as PSO switching, isolation, state retention and always-on, in relation to the specified power domains. Thus, the encoding of Table 3 represents an information structure that specifies what parts of an RTL design fit within what power domains and that also specifies power-control related behavior associated with the different power domains specified by the information structure.

TABLE 3

```
# Define top design
set_top_design top
# Set up logic structure for all power domains
create_power_domain -name PD1 -default
create_power_domain -name PD2 -instances {inst_A inst_B} \
-shutoff_condition {pm_inst.pse_enable[0]}
create_power_domain -name PD3 -instances inst_C \
-shutoff_condition {pm_inst.pse_enable[1]}
create_power_domain -name PD4 -instances inst_D \
-shutoff_condition {pm_inst.pse_enable[2]}
```

TABLE 3-continued

```
# Define static behavior of all power domains and specify timing
constraints
create_power_mode -name PM1 -sdc_files . ./SCRIPTS/cm1.sdc \
-activity_file . ./SIM/top_1.tcf
create_power_mode -name PM2 -off_domains PD2 -sdc_files
. ./SCRIPTS/cm2.sdc
create_power_mode -name PM3 -off_domains {PD2 PD3}
create_power_mode -name PM4 -off_domains {PD2 PD3 PD4}
# Set up required isolation and state retention logic of all domains
create_state_retention_rule -restore_edge {pm_inst.pge_enable[0]} \
-instances inst_A.reg_bank_1.out
create_state_retention_rule -power_domain PD3 -restore_edge \
{pm_inst.pge_enable[1]}
create_state_retention_rule -power_domain PD4 -restore_edge \
{pm_inst.pge_enable[2]}
create_isolation_rule -from PD2 -isolation_condition \
{pm_inst.ice_enable[0]} -isolation_output high
create_isolation_rule -from PD3 -isolation_condition \
{pm_inst.ice_enable[1]}
create_isolation_rule -from PD4 -isolation_condition \
{pm_inst.ice_enable[2]}
```

Figure 4:
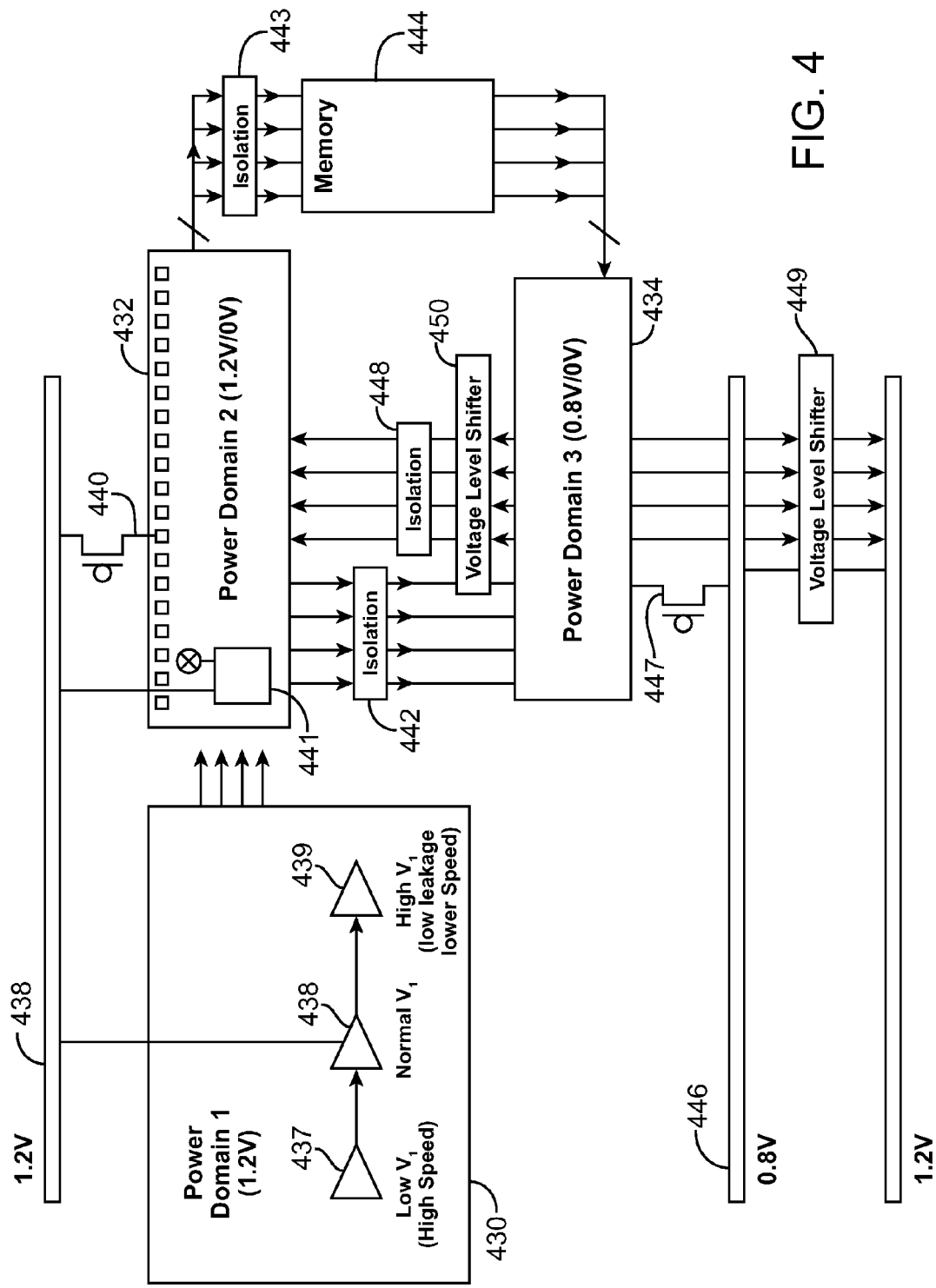
FIG. 4 is an illustrative block diagram representation of a second example design that implements power-related design information according to some embodiments of the invention.

FIG. 4 is an illustrative block diagram representation of a second example design that implements power-related design information according to some embodiments of the invention. Power-related information incorporated into an RTL power information format can be in is used to track and maintain the power-related design intent, power-related power constraint, and power-related technology information for this design. This second example design shows characteristics of advanced power management techniques which can be specified using an RTL power information format. Three power domains are shown: Power Domain 1 (430), Power Domain 2 (432), and Power Domain 3 (434).

Power Domain 1 (430) includes a collection of logic blocks (i.e. function instances) that use the same power supply during normal operation. In this example, Power Domain 1 operates at 1.2V. Power Domain 1 is coupled to a power rail 436 operating at 1.2V. It is noted that a switch is not used to couple Power Domain 1 to the 1.2V power rail. As a result, Power Domain 1 is always "on," and cannot be turned off.

Power Domain 1 includes three cells (i.e. function instances) having different operating parameters. A first cell 437 is associated with a low Vt, which provides operating characteristics of high speed and high leakage. A second cell 438 is associated with a normal Vt, which provides operating characteristics of normal speed and normal leakage. A third cell 439 is associated with a low Vt, which provides operating characteristics of low speed but also low leakage. Designers will attempt to balance the selection of these combinations of cells to achieve a desired set of performance characteristics with minimum leakage.

Power Domain 2 (432) also includes a set of logic blocks. Power Domain 2 can be powered on or off depending upon the particular power mode that is being employed. Therefore, Power Domain 2 can be at either 1.2V or 0V. In this example, a power gating switch 440 is used to power off or on the power domain.

Power Domain 2 contains a state retention power gating (SRPG) cell 441 to maintain state information during the periods of time in which the power domain is powered down. It can be seen that the SRPG cell 441 is separately coupled to the 1.2V power rail so that it can retain state even when the power switch has cut off power generally to the power domain.

Power Domain 2 is associated with appropriate isolation logic to ensure that inadvertent and unintended data is not propagated to other blocks when the power domain is powered down. For example, isolation logic 442 is used to connect Power Domain 2 to Power Domain 3. Similarly, isolation logic 443 is used to connect Power Domain 2 to a memory device 444.

Power Domain 3 (434) is a collection of logic blocks which all operate at 0.8V and the power domain is therefore connected to a power rail 446 at 0.8V. Power Domain 3 can be powered on or off depending upon the particular power mode that is being employed. Therefore, Power Domain 3 can be at either 0.8V or 0V. In this example, a power switch is used to power off or on the power domain.

Power Domain 3 is also associated with appropriate isolation logic 448 to ensure that inadvertent and unintended data is not propagated to other blocks when the power domain is powered down.

Voltage level shifters are used to interact with other blocks that operate at other voltage levels. For example, since Power Domain 2 operates at 1.2V and Power Domain 3 operates at 0.8V, voltage level shifters (449, 450) are used between these two power domains.

Appendix A, which is expressly incorporated herein by this reference, sets forth commands, such as those in Table 3, and related options used in a common power format for example, in accordance with embodiments of the invention to provide power-related information at RTL. In particular, referring to FIGS. 3-4, the commands of Appendix A can be used to specify isolation, state retention, level shifting, always-on and power-switching in relation to power domains using an RTL data structure.

Power Source Hierarchy for Power-Related Information Specified in Relation to an HDL Description of an Integrated Circuit Design A circuit design and corresponding power domains are defined at different levels of abstraction at different stages of a computer aided circuit design flow.

Figure 5A:
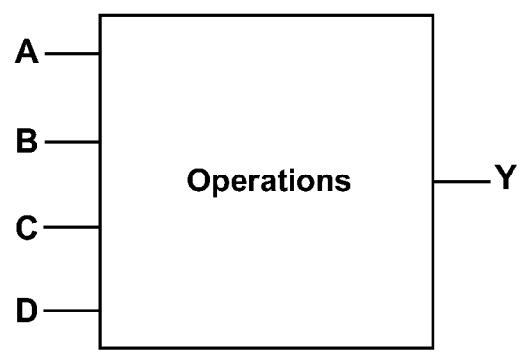
FIG. 5A is an illustrative block diagram of an example power domain specified at an RTL abstract level.

FIG. 5A is an illustrative block diagram of an example power domain that is encoded in computer readable memory and that is specified to encompass certain Operations expressed at an RTL abstract level. The term "Operations" is intended as shorthand for detailed computational expressions from an RTL description of a design, such as operators, process, function and conditionals statements, for example, that relate inputs A, B, C and D to the output Y. The Operations, which are arbitrary in this example, correspond to functions to be implemented with logic gates in the power domain. As such, the Operations constitute one or more function instances allocated to the illustrated power domain. Moreover, an RTL description also may include a set of macro instances, such as I/Os or memories, for example that correspond to physical implementations of gates in this power domain.

Figure 5B:
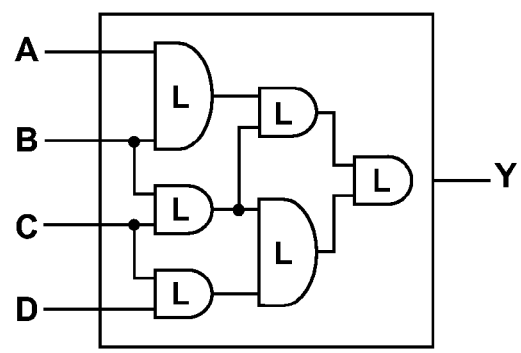
FIG. 5B is an illustrative block diagram of same power domain as FIG. 5A but specified at a logical abstract level.

FIG. 5B is an illustrative block diagram of the same power domain as FIG. 5A that similarly is encoded in computer readable memory but that is specified at a logical abstract level. The power domain is defined at the logical abstract level by a set of arbitrary example logic gates labeled "L" corresponding to the Operations of the RTL abstract level of this power domain. The gates constitute one or more function instances associated with the illustrated power domain. The gates are arranged to illustrate an arbitrary example for the purpose of discussion only. As with the RTL level description, the logical abstract level description also may include a set of macro instances (such as I/Os, memories, and so on) that correspond to the physical implementation of these gates in this power domain. The logical level design specification includes details of connections among gates used to implement the Operations specified in the RTL description.

Figure 5C:
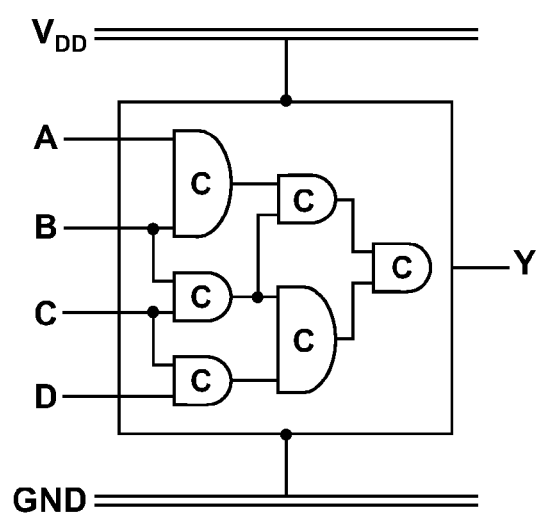
FIG. 5C is an illustrative block diagram of the same power domain as FIGS. 5A-5B but specified at a physical abstract level.

FIG. 5C is an illustrative block diagram of the example of the same power domain as FIGS. 5A-5B that similarly is encoded in computer readable memory but that is specified at a physical abstract level. The power domain is defined at the physical abstract level by a set of physical standard cell instances labeled "C" corresponding to the logic gates "L" of FIG. 5B and to the Operations of FIG. 5A. The cells constitute one or more function instances associated with the illustrated power domain. In addition, the physical level abstract description includes a unique pair of power (VDD) and ground (GND) nets. The physical abstract level description also may include a set of single or multi-rail non-standard cells (such as hard macros such as, I/Os, memories). The physical level design specification includes additional details of connections among gates used to implement the Operations specified in the RTL description.

From FIGS. 5A-5C, it will be appreciated that ordinarily power/ground net related design information is not incorporated into a design until the later stages of the overall design flow when actual library cells have been selected to implement logic functions and physically placed during physical implementation. The library cells typically include power/ground pins suitable for connection to power/ground nets. Typically, neither RTL Operations nor logic level gates are configured for association with power/ground nets.

Figure 6:
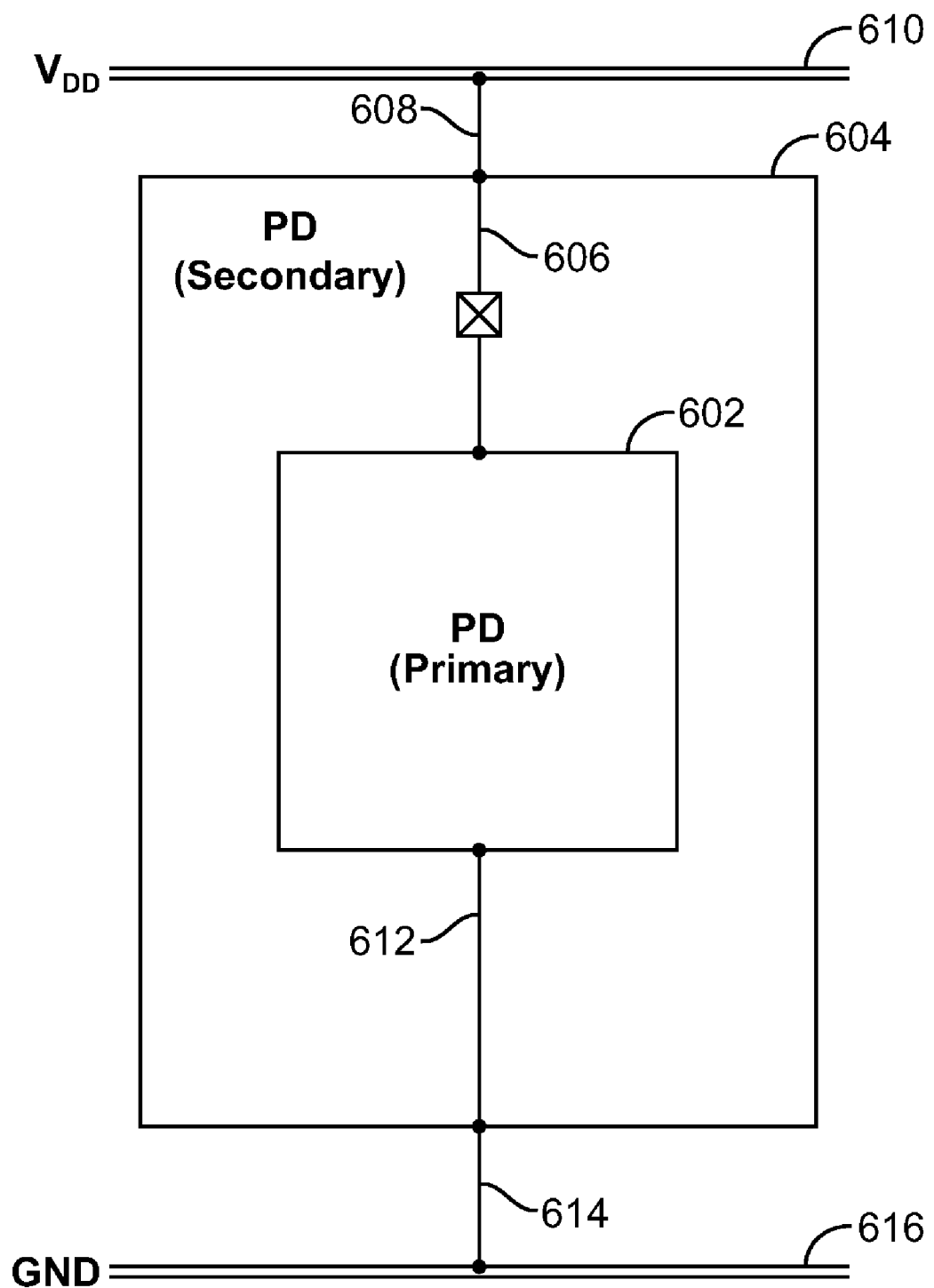
FIG. 6 is an illustrative conceptual level drawing representing a hierarchical relationship among power domains in which a primary power domain obtains power from a secondary power domain in accordance with some embodiments of the invention.

FIG. 6 is an illustrative conceptual level drawing representing a hierarchical relationship among power domains in which a primary power domain obtains power from a secondary power domain. A primary power domain (PD) 602 depends upon a secondary PD 604 as a source of power; if the power to the secondary PD 604 is shut off, the power to the primary PD 602 also will be shut off. A power net 606 of the primary PD 602 is coupled to a power net 608 of the secondary PD 604. The power net 608 of the secondary PD 604, in turn, is coupled to power rail 610 (VDD). Conversely, a ground net 612 of the primary PD 602 is coupled to a ground net 614 of the secondary PD 604. The ground net 614 of the secondary PD 604, in turn, is coupled to ground rail 616 (GND). A power gating switch 607 is provided to permit selective turn on/off of power from the secondary PD 604 to the primary PD 602.

Power control related information that specifies which functional instances from an RTL design are disposed within a given power domain such as the primary PD 602, also may specify power control related behaviors that are active when power to the given power domain is shut off. For instances, power related information associated with an RTL description may indicate that certain signals are to be isolated during power shut off (PSO). The specification of power control related isolation behavior in connection with an RTL description of a PD causes (i.e. instructs) CAD design processes that reference the specification to instantiate isolation logic in the PD during logic synthesis and/or physical design to realize the isolation behavior. The power related information may indicate that the states of certain signals are to be restored following PSO. The specification of power control related state retention behavior in connection with an RTL description of a PD causes (i.e. instructs) CAD design processes that reference the specification to instantiate state retention logic in the PD during logic synthesis and/or physical design to realize the state retention behavior. The power related information may indicate that the states of certain signals are to always remain turned on even during PSO of the PD. The specification of power control related state retention information in connection with an RTL description of a PD causes (i.e. instructs) CAD design processes that reference the specification to instantiate "always on" logic in the PD during logic synthesis and/or physical design to realize the always on behavior.

A possible problem with the dependency of the primary PD 602 upon the secondary PD 604 for power is that shut off of the secondary PD 604 could influence not only the functional behavior of the primary PD 602, but also could influence the behaviors that are to remain active when the primary PD 602 is shut off. In other words, if the secondary PD 604 is shut off then power control related behaviors of the primary PD 602 that are to remain active during PSO also will be affected due to loss of power from the secondary PD 604.

Table 4 illustrates several example power control scenarios for the primary and secondary PDs 602, 604 of FIG. 6. A purpose of Table 4 is to illustrate potential design problems that may arise with power source hierarchies that are best identified early in a design flow.

TABLE 4

| Primary PD PSO State (On/Off) | Secondary PD PSO State (On/Off) |
|---|---|
| On | On |
| Off | On |
| Off | Off |
| On | Off |

The first row illustrates ordinary operation during no PSO by either the primary or the secondary PD 602, 604. The second row indicates operation with the primary PD 602 in a PSO state, and the secondary PD 604 is turned on. The third row illustrates operation in a deep sleep mode, for example, in which both the primary and secondary PDs are shut off. The fourth row, however, illustrates potential an illegal state in which the primary PD 602 is turned on, but the secondary PD 604 is turned off, a potential problem that may arise due to faulty design.

Preferably, such power source related design problems should be identified earlier in the design flow since corrections are easier and less costly at the earlier stages. Unfortunately, in the past as explained with reference to FIGS. 5A-5C, power and ground nets generally have not been presented in a design until later in the design flow, during a physical design stage, for example. The inventors have recognized a need to establish power source hierarchy associations among power domains earlier in a design flow, at the RTL stage for example. One difficulty with specifying power source hierarchy associations among power domains earlier in the overall design flow is that establishing rigid associations early in a design flow, at RTL for example, can restrict design flexibility later in the design flow, such as during a logical and physical design stage. Another major problem with that approach is that it makes a power specification only useful for a specific physical power network which is not good for IP reuse and portability of the IP.

In addressing this problem, the inventors have developed a new information structure to represent power source hierarchy relationships among power domains specified relative to an RTL design and have developed new processes to utilize the new information structure during different stages of the design flow. The new information structure represents hierarchical power source relationships among power domains at different levels of a power domain hierarchy. By definition herein, a secondary power domain serves as a power source for a corresponding primary power domain. The new information structure advantageously permits a power source hierarchy among power domains to be specified relative to an RTL description of a design, without limiting physical design flexibility. The new information also enables physical implementation tool to implement the various power and ground network according to the specification and enables verification tool to check the physical implementation against the specification.

Figure 7A:
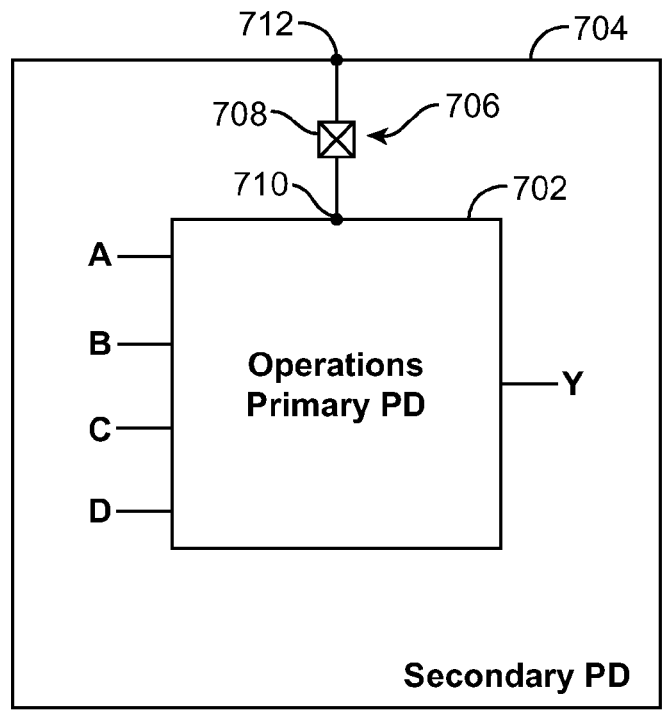
FIGS. 7A-7B are illustrative diagrams representing a hierarchical power source association between a primary power domain 702 and a secondary power domain 704 at an RTL abstraction level (FIG. 7A) and at a logic abstraction level (FIG. 7B) in accordance with some embodiments of the invention.
Figure 7B:
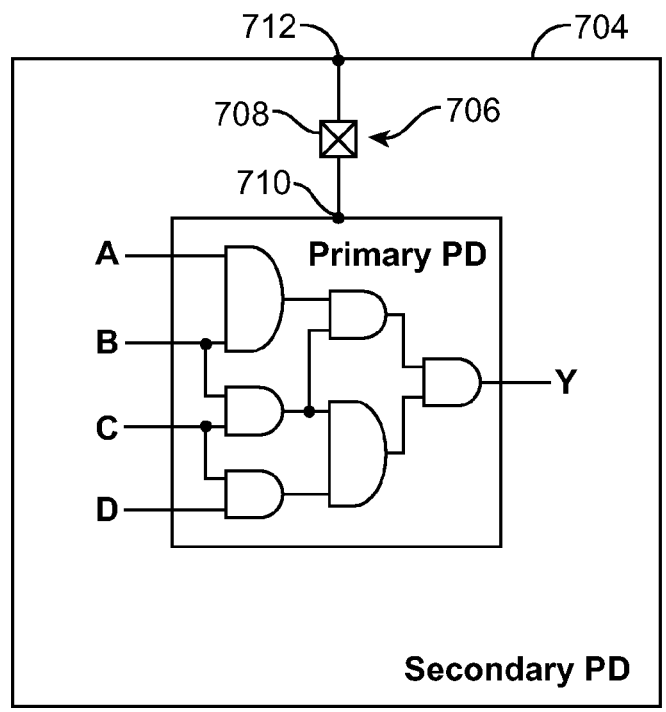

FIGS. 7A-7B are illustrative diagrams representing a hierarchical power source association between a primary power domain 702 and a secondary power domain 704 at an RTL abstraction level (FIG. 7A) and at a logic abstraction level (FIG. 7B). At the RTL abstraction level, the Operation (which may comprise one or more RTL function instances) of the primary power domain 702 of FIG. 7A is identical to the Operation of the power domain of FIG. 5A. At the logic abstraction level, logic gates (which may comprise one or more logic level function instances) of the primary power domain 702 of FIG. 7B are identical to the logic abstraction level gates of the power domain of FIG. 5B. Thus, FIGS. 7A-7B represent the same design at different levels of design abstraction. In both the RTL abstraction level specification of FIG. 7A and the logic abstraction level representation of FIG. 7B, association 706 expresses a hierarchical power source relationship between the primary power domain 702 and the secondary power domain 704. In this example, the relationship 706 signifies a power gated switch relationship 708 between a power/ground net, represented by node 710, of the primary power domain 702 and a power/ground net, represented by node 712, of the secondary power domain 704. The hierarchical power source relationship represented by the structural association 706 signifies that Operations (FIG. 7A) and logic gates (FIG. 7B) of the primary power domain 702 derives power from the secondary power domain 704, and that a switch function 708 is to be included in the design that controls PSO of the Operations (FIG. 7A) and logic gates (FIG. 7B) of the primary power domain 702 by selectively connecting/disconnection a power/ground net 710 of the primary power domain 702 to/from a power/ground net 712 of the secondary power domain 704.

The hierarchical structural association 706 expresses a hierarchical power relationship at a level of abstraction that does not limit design choice at later design stages such as a physical design stage. Neither the power source hierarchy information structure represented by FIG. 7A nor that represented by FIG. 7B provides details identifying power/ground nets. Moreover, neither FIG. 7A nor FIG. 7B, specifies switch implementation details. In this example, there is no indication of whether the switch function 708 relationship 706 implies power net switching or ground net switching. Thus, although a power source hierarchy relationship between the primary power domain 702 and the secondary power domain 704 is expressed, considerable flexibility remains as to physical implementation.

The hierarchical power source relationship 706 of FIGS. 7A-7B also signifies structural relationships among power control related behaviors of the primary power domain 702 and power derived from the secondary power domain. Power control related behaviors are active during power shut off (PSO). Power control related behaviors include one or more of PSO isolation behavior, PSO state retention behavior and PSO always-on behavior. The hierarchical power relationship 706 signifies that each of these power control related behaviors specified for the primary power domain 702 derives power from the secondary power domain 704. The hierarchical power relationship 706 also implicitly signifies that the power switch relationship 708 does not apply to these power control related behaviors, which are active during PSO of the functional behaviors (e.g. Operations in FIG. 7A and logic gates of FIG. 7B).

Figure 8:
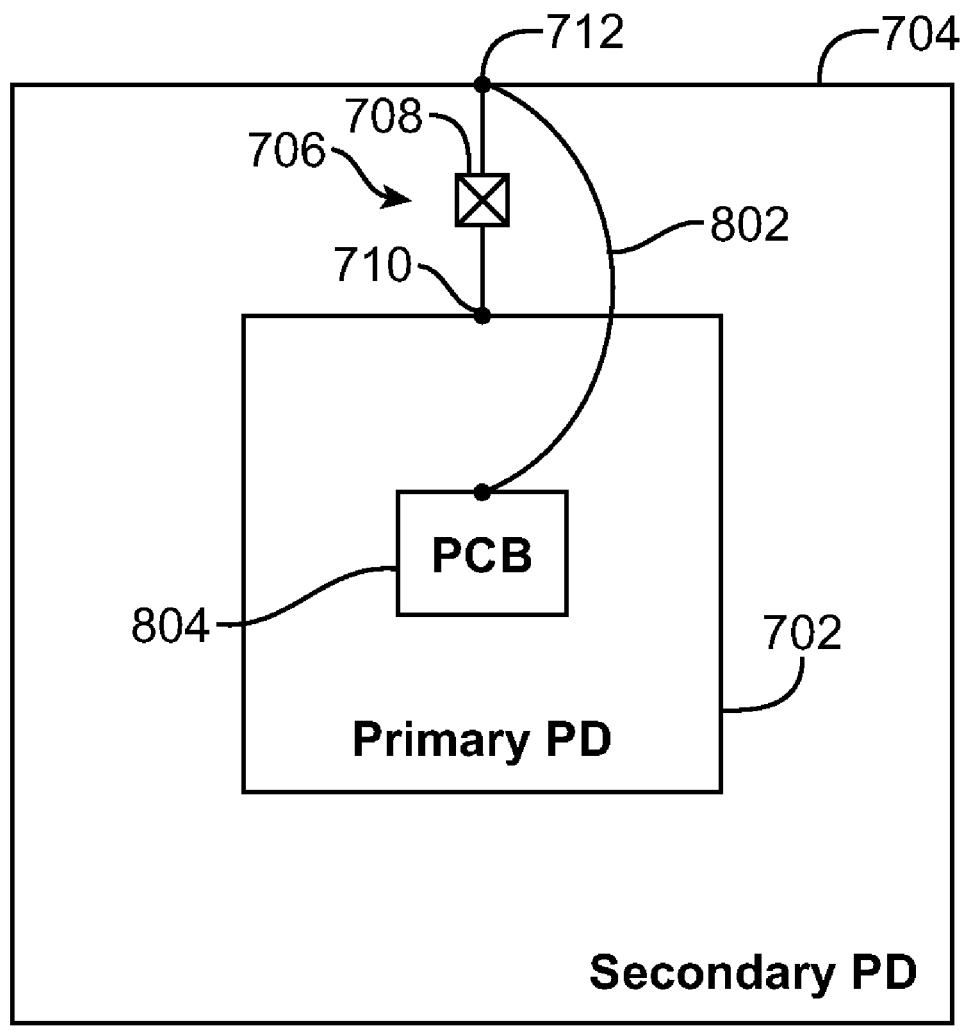
FIG. 8 is an illustrative diagram representing a hierarchical structural relationship between power control related behavior in a primary power domain and power derived from a corresponding secondary domain in accordance with some embodiments of the invention.

FIG. 8 is an illustrative diagram representing a hierarchical power relationship between power control related behavior (PCB) 802 in a primary power domain and power provided by a corresponding secondary power domain. In this example, the primary power domain 702 includes power control related behavior (PCB) (e.g. isolation, state retention or always-on) specified for the primary power domain by power control information stored in computer readable memory. As explained with reference to FIGS. 7A-7B, a hierarchical power source association 706 specifies a hierarchical power source relationship between a primary power domain 702 and a corresponding secondary power domain 704. In this example, the hierarchical structural relationship signifies a power gating switch relationship 708 between the primary and secondary power domains 702, 704. However, as shown in FIG. 8, the hierarchical power source relationship 706 also signifies a power source relationship 802 between the power control related behavior (PCB) 804 within the primary power domain 702 and the secondary power domain 704 that is not affected by the power gating relationship 708. This non-switch gated power source relationship signifies that the PCB 804 continues to receive power from the secondary power domain 704 when the switch behavior 708 turns off power from the secondary power domain 704 to the functional behaviors of the primary power domain 702.

Figure 9:
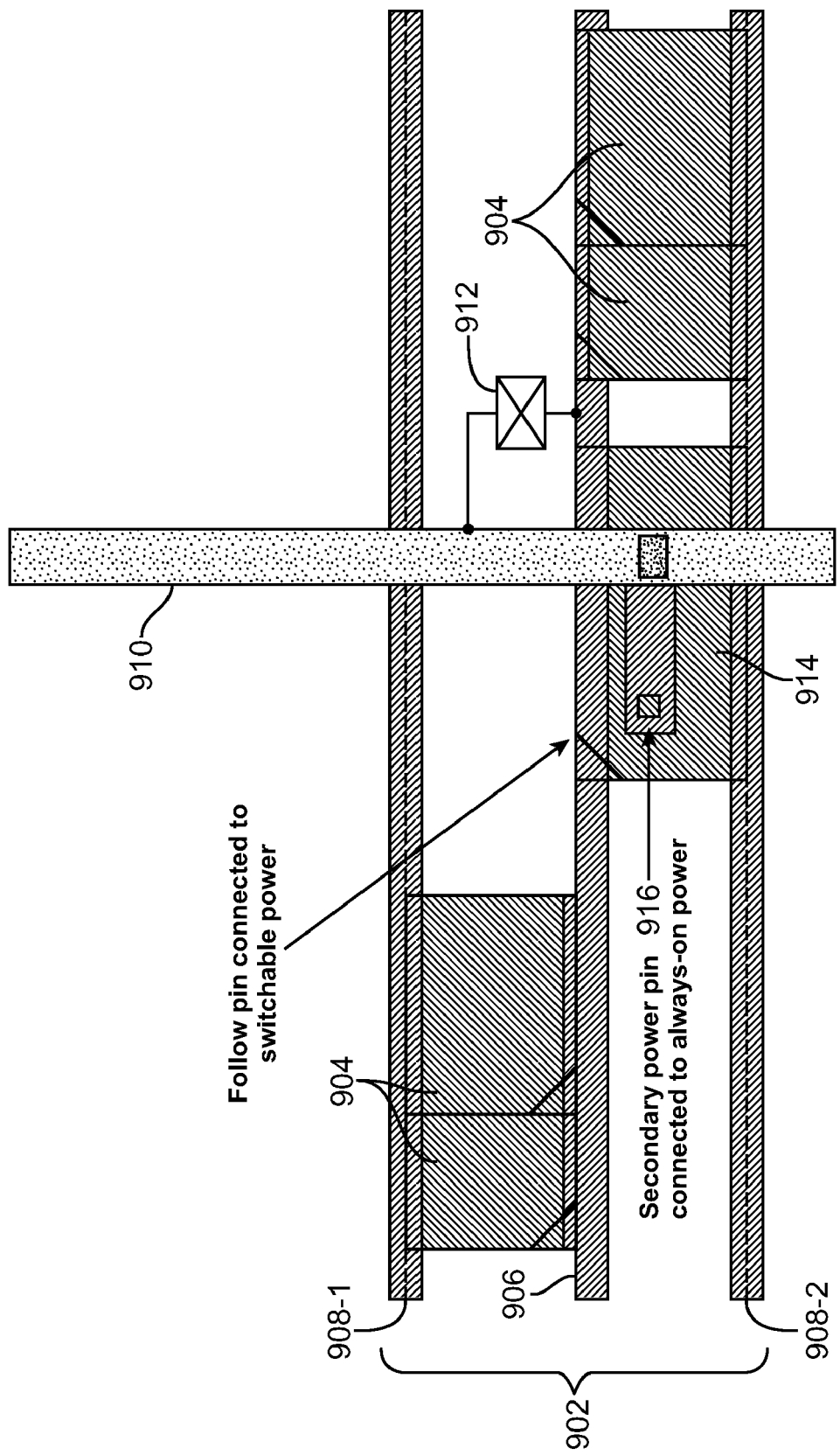
FIG. 9 is an illustrative drawing of a physical level standard cell layout of an example primary power domain having an additional power pin connected to a secondary power domain.

FIG. 9 is an illustrative drawing of a physical level standard cell layout of an example primary power domain 902 having a switched connection to a secondary power domain (shown as 912). The primary power domain 902 includes multiple individual switched function cells 904 (which correspond to one or more RTL function instances) disposed between a switched or gated power rail (VDD) 906 and ground (GND) rails 908-1, 908-2. A secondary connector 910 is coupled to a secondary power domain (not shown). Power gating switch circuitry 912 selectively connects/disconnects the power rail 906 to/from the secondary connector 910 to thereby turn on/off power to the switched function cells 904. A power related control behavior cell (e.g. state retention cell, or always on cell) 914 includes a secondary power pin 916 coupled directly to the secondary connector 910 so that cell 914 is not switched by the switch circuitry 912. Thus, the power related behavior control cell 914 of the primary power domain 902 can be active even if the function cells 904 of the primary power domain 902 are shut off by opening of the switch 912 to disconnect the secondary connector 910 from the power rail 906 of the primary power domain 902. It will be appreciated, however, that turning on/off the secondary power domain also results in turning on/off of the power related control cell 914. Moreover, it will be appreciated that this illustrative standard cell layout is just one possible physical implementation example.

Figure 10A:
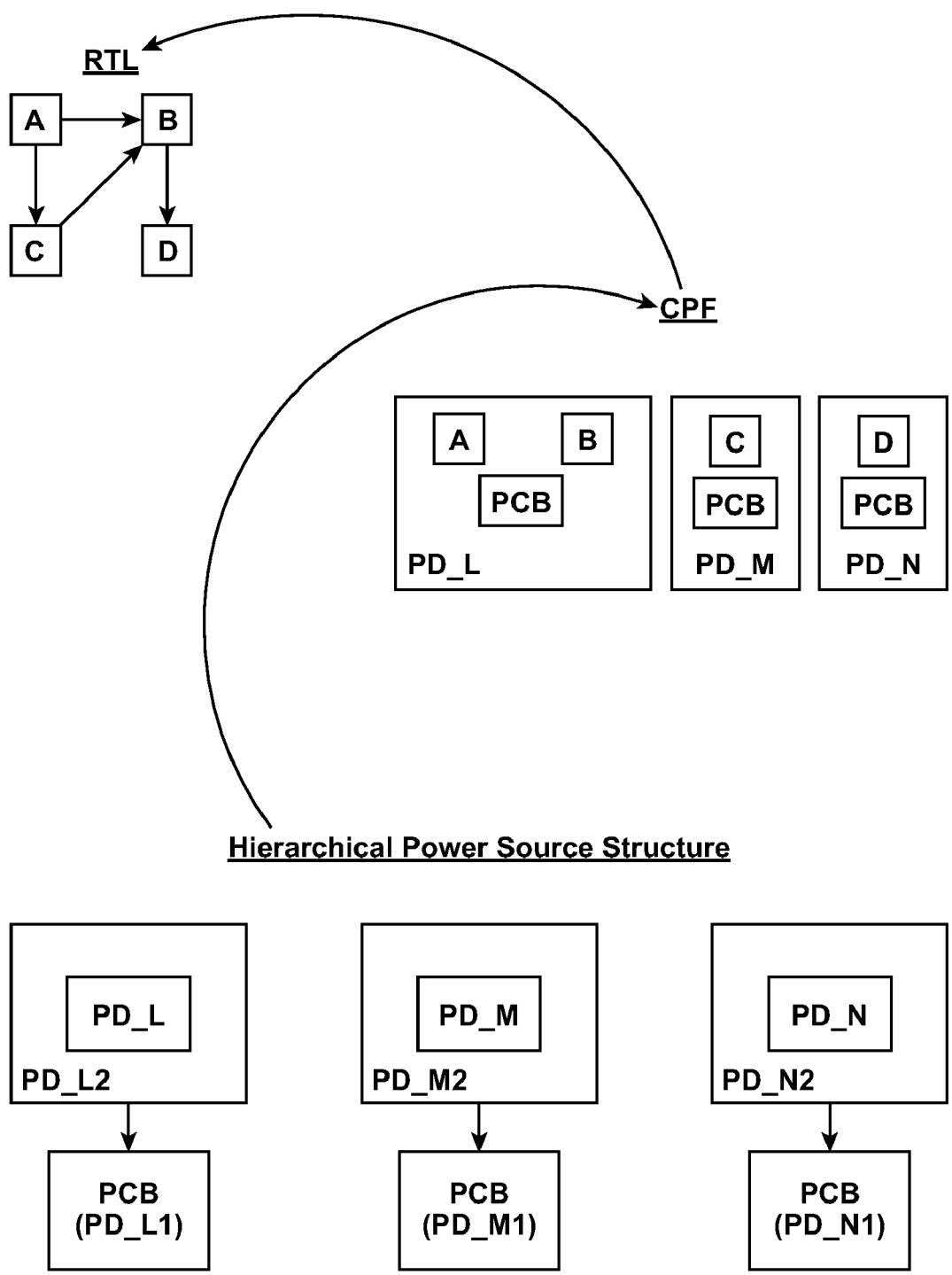
FIG. 10A is an illustrative drawing of an information structure having associations among an RTL description of a design, a power control information structure and a hierarchical power source association structure in accordance with some embodiments of the invention.

FIG. 10A is an illustrative drawing of an information structure encoded in computer readable memory having associations among an RTL description of a design, a power control information structure and a hierarchical power source association structure in accordance with some embodiments of the invention. Under the heading "RTL" there is shown a pictorial representation of an RTL specification for a design. Under the heading "CPF", there is shown a pictorial representation of specification of power domains defined through associated with function instances within the RTL specification. Under the heading "Hierarchical Power Source Association", there is shown a pictorial representation of hierarchical power source relationships for the defined power domains identified under the "CPF" heading.

The RTL specification specifies four function instances "A", "B", "C" and "D". The arrows indicate the flow of information among the instances.

The power domain specification defines power domain PD_L as associated with function instances "A" and "B" and also specifies associated power control behavior (PCB) for PD_L. The power domain specification also associates power domain PD_M with function instance "C" and also specifies associated power control behavior (PCB) for PD_M. The power domain specification also associates power domain PD_N with function instance "D" and also specifies associated power control behavior (PCB) for PD_N.

The hierarchical power source structure defines an (HPSC) a hierarchical power source association between PD_L and PD_L2, in which PD_L is the primary power domain and PD_L2 is its secondary power domain. The HPSC also provides an indication that the PCB associated with PD_L has a power source association with PD_L2 that is not power switch gated. It will be appreciated that the indication that the PD_L PCB associated with PD_L2 is not power switch gated may be implicit in that EDA tool code (not shown) that interprets the HPSC automatically recognizes an non-gated power source relationship between the PD_L PCB and the PD_L2.

The HPSC defines a hierarchical power source association between PD_M and PD_M2, in which PD_M is the primary power domain and PD_M2 is its secondary power domain. The HPSC also provides an indication that the PCB associated with PD_M has a power source association with PD_M2 that is not power switch gated. It will be appreciated that the indication that the PD_M PCB associated with is not power switch gated PD_M2 may be implicit in that EDA tool code (not shown) that interprets the HPSC automatically recognizes an unswitched power source relationship between the PD_M PCB and the PD_M2.

The HPSC defines a hierarchical power source association between PD_N and PD_N2, in which PD_N is the primary power domain and PD_N2 is its secondary power domain. The HPSC also provides an indication that the PCB associated with PD_N has a power source association with PD_N2 that is not power switch gated. It will be appreciated that the indication that the PD_N PCB is associated with PD_N2 may be implicit in that EDA tool code (not shown) that interprets the HPSC automatically recognizes an unswitched power source relationship between the PD_N PCB and the PD_N2.

Figure 10B:
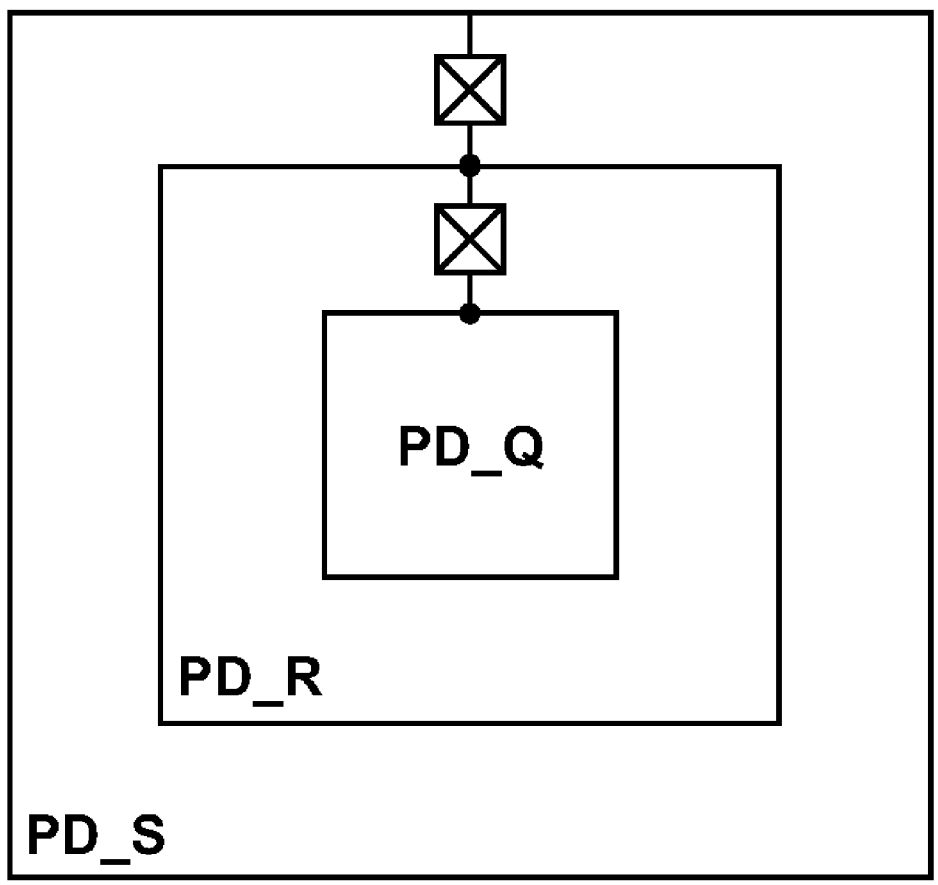
FIG. 10B is an illustrative drawing representing a three-level hierarchical power source relationship among power domains in accordance with some embodiments of the invention.

FIG. 10B is an illustrative drawing representing a three-level hierarchical power source relationship among power domains. Power domain PD_R is a secondary power domain for power domain PD_Q. Power domain PD_S is a secondary power domain for power domain PD_R. It will be appreciated, for example, that respective PCB instances (e.g. isolation, state retention, always on) (not shown) may be defined for both PD_Q and for PD_R.

Figure 11B:
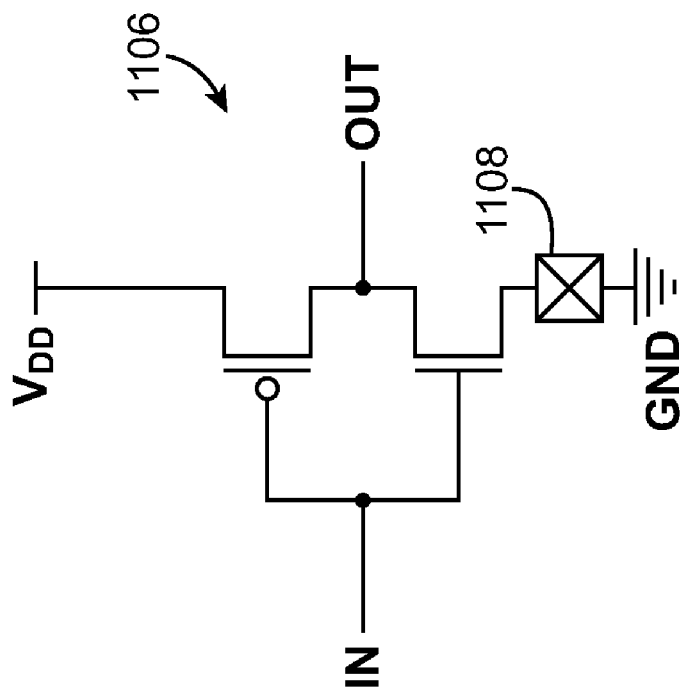
FIGS. 11A-11B are illustrative transistor level drawings of a CMOS inverter circuit showing switching a power net (FIG. 10A) and switching a ground net (FIG. 10B).
Figure 11A:
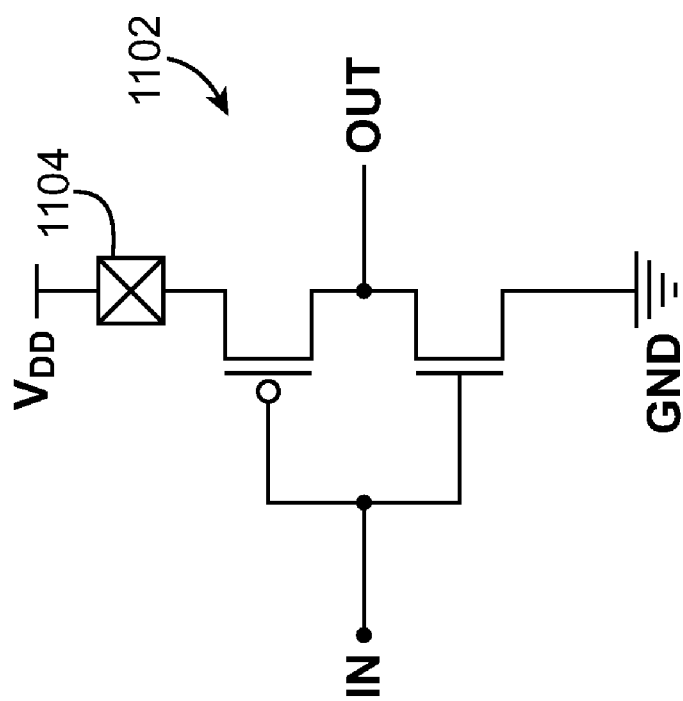

FIGS. 11A-11B are illustrative transistor level drawings of a CMOS inverter circuit showing switching a power net (FIG. 11A) and switching a ground net (FIG. 11B). FIG. 11A shows an illustrative first inverter circuit 1102 in which a switch 1104 is inserted between the VDD power net and the circuit components. FIG. 11B shows an illustrative second inverter circuit 1106 in which a switch 1108 is inserted between the GND net and the circuit components. The first and second circuits 1102, 1104 illustrate that power to the inverter's two transistors may be switched on/off by switching either the power net (VDD) or by switching the ground net (GND). It will be understood that the possibility of switching either power or ground nets to achieve PSO adds flexibility to physical level design alternatives.

Referring to FIG. 10, it will be appreciated that power switch gating between PD_L and PD_L2 and between PD_M and PD_M2 and between PD_N and PD_N2 can be implemented with power net switching (FIG. 11A) or with ground net switching (FIG. 11B). Moreover, even within a single design, some hierarchically related power domains may employ power net switching between them and others may employ ground net switching. It will be understood that the information structures of FIG. 10 express the power source hierarchy relationships among power domains but leave the implementation details open to refinement at later stages in the design flow.

Example Design Using Power Source Hierarchy for Power-Related Information

Tables 5-6 are specific illustrative examples of an RTL specification of the general type illustrated under the heading "RTL" in FIG. 10 (although these Tables 5-6 illustrate a different example from the generalized example of FIG. 10)

Table 5 is an RTL design specification of an example soft IP "BlockA". The RTL code can be used by a computer system programmed with an EDA tool for design simulation or design verification or to derive a logic level design or a physical level design, for example.

TABLE 5

```
module BlockA1_mod(A, B, C, O1, O2, O3);
input C;
input [7:0] A,B;
output O2;
output [7:0] O1, O3;
assign O2 = C;      //feedthrough
.....                    //glue logic
always_on_cell I1(.A(B[0]), .Z(O1[0]));    //instantiated an always on library cell
endmodule
module BlockA2(A, B, O1);
input A;
input [7:0] B;
output [8:0] O1;
.....//normal logic
endmodule
module BlockA_mod(M,N,X,Y);
input [7:0] M,N;
output [8:0] X,Y;
wire W;
wire [7:0] W2;
BlockA1_mod BlockA1(.A(M), .B(N), .C(Y[0]), .O1(X), .O2(W), .O3(W2));
BlockA2_mod BlockA2(.A(W), .B(W2), .O1(Y));
endmodule
```

Table 6 is an RTL specification of a top level design "SOC" that includes a few different blocks including soft IP BlockA.

The RTL code can be used by a computer system programmed with an EDA tool for design simulation or design verification or to derive a logic level design or a physical level design, for example.

TABLE 6

```
module BlockB(A, O);
input [7:0] A;
output [7:0] O;
.....                  //glue logic
endmodule
module BlockC(A, O);
input [7:0] A;
output [8:0] O1;
.....//normal logic
endmodule
module SoC(I,O1,O2);
input [4:0] I;
output [8:0] O1,O2;
wire W;
wire [7:0] y1,y2,X,Y;
assign y1 = I *4;
assign y2 = I *10;
BlockA_mod BlockA(.M(y1), .N(y2), .X(X), .Y(Y));
BlockB_mod BlockB(.A(X), .O(O1));
BlockC_mod BlockC(.A(Y), .O(O2));
Endmodule
```

Figure 12:
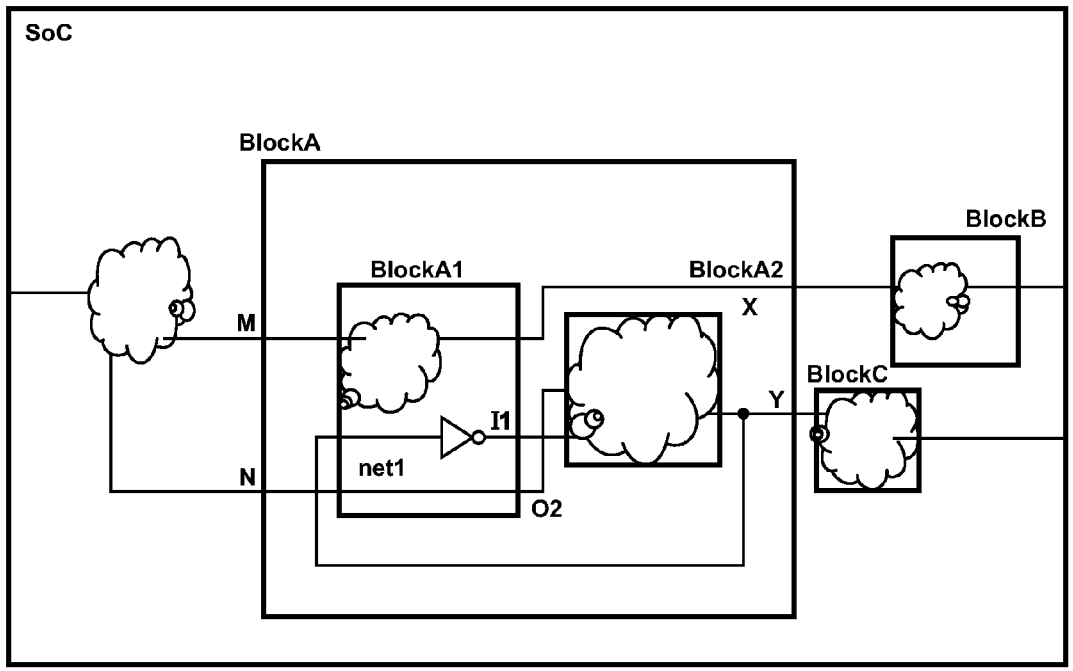
FIG. 12 is an illustrative block level diagram of the RTL design of Tables 5-6 in accordance with some embodiments of the invention.

FIG. 12 is an illustrative block level diagram of the RTL design of Tables 5-6.

The example RTL design of Tables 5-6 and FIG. 12 has no power ports and no power nets. The power domain intent can be described in a separate data structure containing power related information, in a common power format (CPF), for example. The design has three power domains with two of them being always-on and one of them being a switchable power domain. The soft IP BlockA has two switchable power domains and two always-on power domains. Within the block BlockA1, there is a feed through net and a hand instantiated always on instance I1. I1 is controlled by an always on power domain within BlockA. However, the always on power domain in BlockA takes the power supply from a power domain at SoC that is switchable.

Tables 7-8 are specific illustrative examples of a power related control specification integrated together with an HPSC of the general type illustrated under the respective headings "CPF" and "hierarchical power source structure" in FIG. 10 (although these Tables 7-8 illustrate a different example from the generalized example of FIG. 10)

Table 7 is an RTL power related specification with hierarchical power source information for BlockA. The RTL code can be used by a computer system programmed with an EDA tool for design simulation or design verification or to derive a logic level design or a physical level design, for example.

TABLE 7

```
set_design BlockA -ports { psw[0:1] iso[0:1] srpg}
create_power_domain -name PD_VDD1 -boundary_ports { M N } -default
create_power_domain -name PD_VDD2 -boundary_ports {Y}
create_power_domain -name PD_X -boundary_ports {X}
create_power_domain -name PD_VDD1_SW -instances { BlockA1} -shutoff_condition { !psw[0] }
create_power_domain -name PD_VDD2_SW -instances { BlockA2} -shutoff_condition { !psw[1] }
```

TABLE 7-continued

```
create_power_switch_rule -name switch1 -domain PD_VDD1_SW -secondary_domain PD_VDD1
create_power_switch_rule -name switch2 -domain PD_VDD2_SW -secondary_domain PD_VDD2
create_isolation_rule -name iso1 -from PD_VDD1_SW -isolation_enable iso[0]
create_isolation_rule -name iso2 -from PD_VDD2_SW -output_type hold -isolation_enable iso[1]
create_state_retention_rule -name sr1 -domain PD_VDD2_SW -restore_edge srpg
identify_secondary_domain -instance {BlockA1/I1}-secondary_domain { PD_VDD2 }
end_design
```

The highlighted text represents power source hierarchy related command options or option values. The semantics of each command is explained as below:

set_design specifies several virtual input ports of the block. The virtual ports can be power and ground port or data ports. Each EDA tool in the flow should treat these ports as if they exist for the module.

Power domain PD_VDD1_SW is a switchable domain with BlockA1 as its member. By definition, all instances within the block would loose its signal value if psw[0] is 0.

Power domain PD_VDD2_SW is a switchable domain with BlockA2 as its member. By definition, all instances within the block would loose its signal value if psw[1] is 0.

Each create_power_switch_rule command specifies the secondary power domain from each switchable power domain. The create_isolation_rule commands specify the isolation logic required at the outputs of power domain PD_VDD1_SW and PD_VDD2_SW. However, the pin of BlockA1/O2 should not be isolated according to isolation rule 'isol' but 'iso' since the driving power domain of the pin is not PD_VDD1_SW but PD_VDD2_SW.

The create_state_retention_rule command specifies that all registers within domain PD_VDD2 SW would be state retention registers. The additional semantics is that the secondary power domain (PD_VDD2) of PD_VDD2_SW provides the power supply for the retention behavior. Since PD_VDD2 is always on at the block level, the retention behavior would always be observed when PDD_VDD2_SW is switched off. The identify_secondary_domain command identifies a special gate in BlockA1. Even though the gate I1 sits within power domain PD_VDD1_SW but its real function is controlled by the secondary power domain PD_VDD2. In other words, the instance I1 will never be turned off at BlockA since PD_VDD2 is an always on domain.

Table 8 is an RTL power related specification with hierarchical power source information for the SOC. The RTL code can be used by a computer system programmed with an EDA tool for design simulation or design verification or to derive a logic level design or a physical level design, for example.

The highlighted text represents power hierarchy related command options or option values. The semantics of each command is explained as below:

The -domain_mapping option for set_instance. The semantics of this command is explained as below:

The domain_mapping command specifies that the top level domain PD_VDDA maps to the block level domain PD_VDD1 and the top level domain PD_VDDB_SW maps to the block level domain PD_VDD2. They are mappable since the block level power domains are all always on domain.

Note that since the top level domain PD_VDDB_SW is switchable, it implies that the block level domain PD_VDD2 is also switchable.

As a result, the "always-on" instance BlockA/BlockA1/I1 is not always on any more since its secondary power domain PD_VDD2 becomes switchable at top level. Its signal value needs to be trashed during simulation if signal 'psw3' is 0.

Similarly, the retention logic specified for the block level domain PD_VDD2_SW will be in the deep sleep mode (no retention) when PD_VDDB_SW is switched off since its secondary power domain PD_VDD2 maps to PD_VDDB_SW.

Tables 9-10 show that with additional commands, the above power related design intent can be extended to drive physical implementation. One advantage of the use of a hierarchical power source information structure is that the power and ground nets of the top level domains and the power and ground nets of the block level domains can be connected automatically from the power domain semantics and set_instance command. Also the power and ground nets for the special power cells such as always-on cell, retention cell etc can be connected to the correct power pins by the command semantics, without any explicit usage of another command to connect each net and pin manually.

Table 9 shows extended power related information for Table 7 for physical implementation of block BlockA1. The RTL code can be used by a computer system programmed with an EDA tool for design simulation or design verification or to derive a logic level design or a physical level design, for example.

TABLE 8

```
set_design SoC
create_power_domain -name PD_VDDA -default
create_power_domain -name PD_VDDB -instances { BlockB }
create_power_domain -name PD_VDDB_SW -instances {BlockC} -shutoff_condition { !psw3}
create_power_switch_rule -name switch1 -domain PD_VDDB_SW -secondary_domain
PD_VDDB
create_isolation_rule -name iso1 -from PD_VDDB_SW -isolation_enable iso_en
set_instance iBlockA -port_mapping { {psw[0] psw1} {psw[1] psw2} {iso[0] iso1} \
{iso[1] iso2} {srpg sr1}} \
        -domain_mapping { {PD_VDD1 PD_VDDA} {PD_VDD2 PD_VDDB_SW}}
source BlockA.cpf
end_design
```

TABLE 9

```
set_design BlockA -ports { psw[0:1] iso[0:1] srpg}
create_power_domain -name PD_VDD1 -boundary_ports { M N } -default
create_power_domain -name PD_VDD2 -boundary_ports {Y}
create_power_domain -name PD_X -boundary_ports {X}
create_power_domain -name PD_VDD1_SW -instances { BlockA1} -shutoff_condition { !psw[0] }
create_power_domain -name PD_VDD2_SW -instances { BlockA2} -shutoff_condition { !psw[1] }
create_power_switch_rule -name switch1 -domain PD_VDD1_SW -secondary_domain PD_VDD1
create_power_switch_rule -name switch2 -domain PD_VDD2_SW -secondary_domain PD_VDD2
create_isolation_rule -name iso1 -from PD_VDD1_SW -isolation_enable iso[0]
create_isolation_rule -name iso2 -from PD_VDD2_SW -output_type hold -isolation_enable iso[1]
create_state_retention_rule -name sr1 -domain PD_VDD2_SW -restore_edge srpg
identify_power_logic -type always_on -instance {BlockA1/I1} -secondary_power_domain PD_VDD2
The following are command for physical implementation
create_power_nets -nets {VDD1 VDD2 VDD1_SW VDD2_SW}
create_ground_nets -nets {VSS1 VSS1_SW}
update_power_domain -name PD_VDD1 -internal_power_net VDD1 -internal_ground_net VSS1
update_power_domain -name PD_VDD2 -internal_power_net VDD2 -internal_ground_net VSS1
update_power_domain -name PD_VDD1_SW -internal_power_net VDD1_SW \
-internal_ground_net VSS1
update_power_domain -name PD_VDD2_SW -internal_ground_net VSS1_SW
update_power_switch_rule -name switch2 -type footer
end_design
```

Detail semantics are explained as below:

PD_VDD1 and PD_VDD2 are not derived from any other power domain. So the corresponding primary power and ground nets should connect to the primary input ports with the same name. If the ports do not exist, tool should create such port with the name and make connection.

PD_VDD1_SW is switched domain and by default the switch rule takes a header switch. Implementation tool will take the primary power net VDD1 from its secondary power domain PD_VDD1 and connect it to the input side of the power switch, where the output side of the switch will be connected to the primary power net of the domain, i.e. VDD1_SW.

PD_VDD2_SW is a switchable domain and the power switch rule says it is a footer type of switch. Implementation tool will take the primary ground net VSS1 from its secondary power domain PD_VDD2 and connect it to the input side of the power switch, where the output side of the switch will be connected to the primary ground net of the domain, i.e. VSS1_SW. The primary power net of the domain is not specified but by default the primary power net of its secondary power domain is used.

For the always on cell BlockA1/I1, the command define_always_on_cell gives the power pin names for the follow pin and secondary power pin. The pin in option -power_switchable is the follow pin name and it should be connected to the primary power net (VDD1_SW) of its domain. The pin in option -power is the secondary power pin name and it should be connected to the primary power net (VDD2) of the associated secondary power domain specified in identify_power_logic command.

For all retention flops in BlockA2, the command define_state_retention_cell gives the power pin names for the follow pin and secondary power pin. The pin in option -power_switchable is the follow pin name and it should be connected to the primary power net (VDD2_SW) of its domain. The pin in option -power is the secondary power pin name and it should be connected to the primary power net (VDD2) of its secondary domain by definition.

Table 10 shows extended power related information for Table 8 for physical implementation of SOC. The RTL code can be used by a computer system programmed with an EDA tool for design simulation or design verification or to derive a physical level design, for example.

TABLE 10

```
set_design SoC
create_power_domain -name PD_VDDA -default
create_power_domain -name PD_VDDB -instances { BlockB }
create_power_domain -name PD_VDDB_SW -instances {BlockC} -shutoff_condition { !psw3}
create_power_switch_rule -name switch1 -domain PD_VDDB_SW -master PD_VDDB
create_isolation_rule -name iso1 -from PD_VDDB_SW -isolation_enable iso_en
set_instance iBlockA -port_mapping { {psw[0] psw1} {psw[1] psw2} {iso[0] iso1} \
   {iso[1] iso2} {srpg sr1}} \
        -domain_mapping { {PD_VDD1 PD_VDDA} {PD_VDD2 PD_VDDB_SW}}
source BlockA.cpf
####The following are command for physical implementation
create_power_nets -nets {VDDA VDDB VDDB_SW}
create_ground_nets -nets {VSSA}
update_power_domain -name PD_VDDA -internal_power_net VDDA -internal_ground_net VSSA
update_power_domain -name PD_VDDB -internal_power_net VDDB -internal_ground_net VSSA
update_power_domain -name PD_VDDB_SW -internal_power_net VDDB_SW
end_design
```

The semantics of power/ground net connection to the ports are the quite similar to what is explained above for the block level power related information in a common power format. What is interesting here is the way how the hierarchical flow can be handled for the power/ground net connection:

The block level power domain PD_VDD1 is mapped into the top level power domain PD_VDDA. As a result, the primary power net of PD_VDDA, which is VDDA should connect to the port VDD1 which is the port the primary power net of PD_VDD1 connected to. Also, the primary ground net of PD_VDDA, which is VSSA should be connected to the port VSS1 which is the port the primary ground net of PD_VDD1 connected to.

The block level power domain PD_VDD2 is mapped to the top level power domain PD_VDDB_SW. As a result, the primary power net of PD_VDDB_SW, which is VDDB_SW should connect to the port VDD2 which is the port the primary power net of PD_VDD2 connected to. Also, the primary ground net of PD_VDDB, which is VSSA should be connected to the port VSS1 which is the port the primary ground net of PD_VDD2 connected to.

Figure 13:
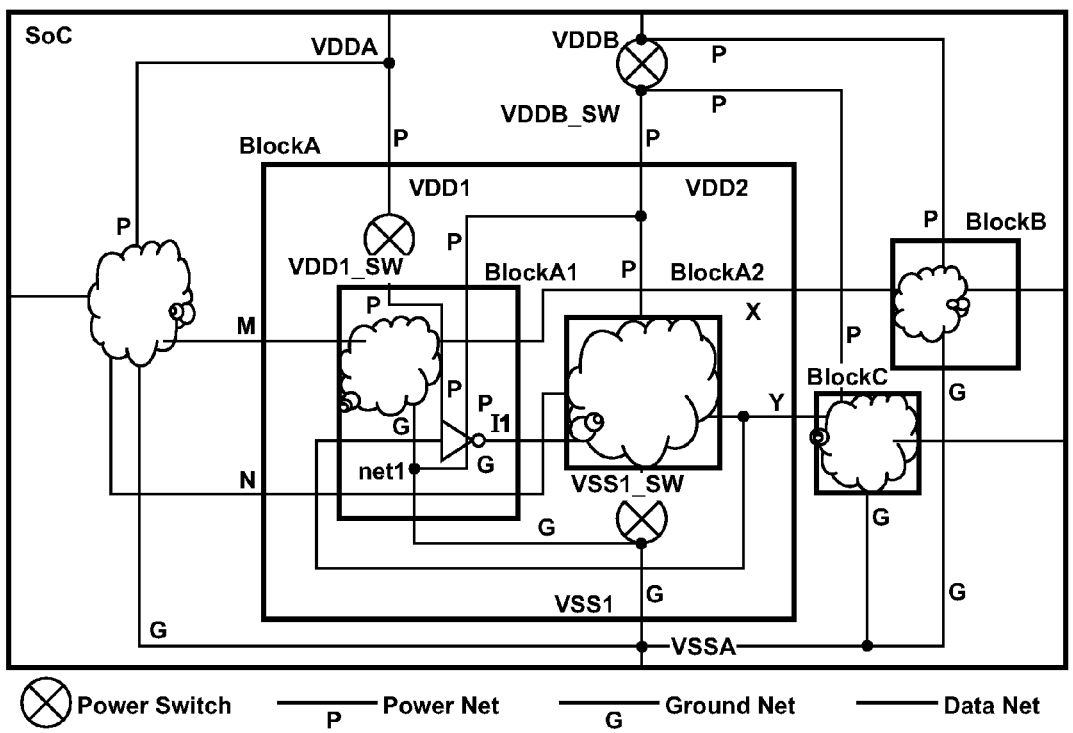
FIG. 13 is an illustrative block level diagram of the RTL design of Tables 5-6 that has been fully connected to power and ground and switch after physical implementation using power related information of Tables 7-10 in accordance with some embodiments of the invention.

FIG. 13 is an illustrative block level diagram of the RTL design of Tables 5-6 that has been fully connected for power and ground and switch after physical implementation using power related information of Tables 7-10. Note with the power and ground connections are embedded in the command semantics. Also note that the focus of FIG. 13 is to shows power domain boundaries and the hierarchical power relationships among power domains. The 'clouds' within power domains represent behaviors associated with these power domains. Details of these behaviors are omitted so as to not obscure key points with irrelevant details.

Figure 14:
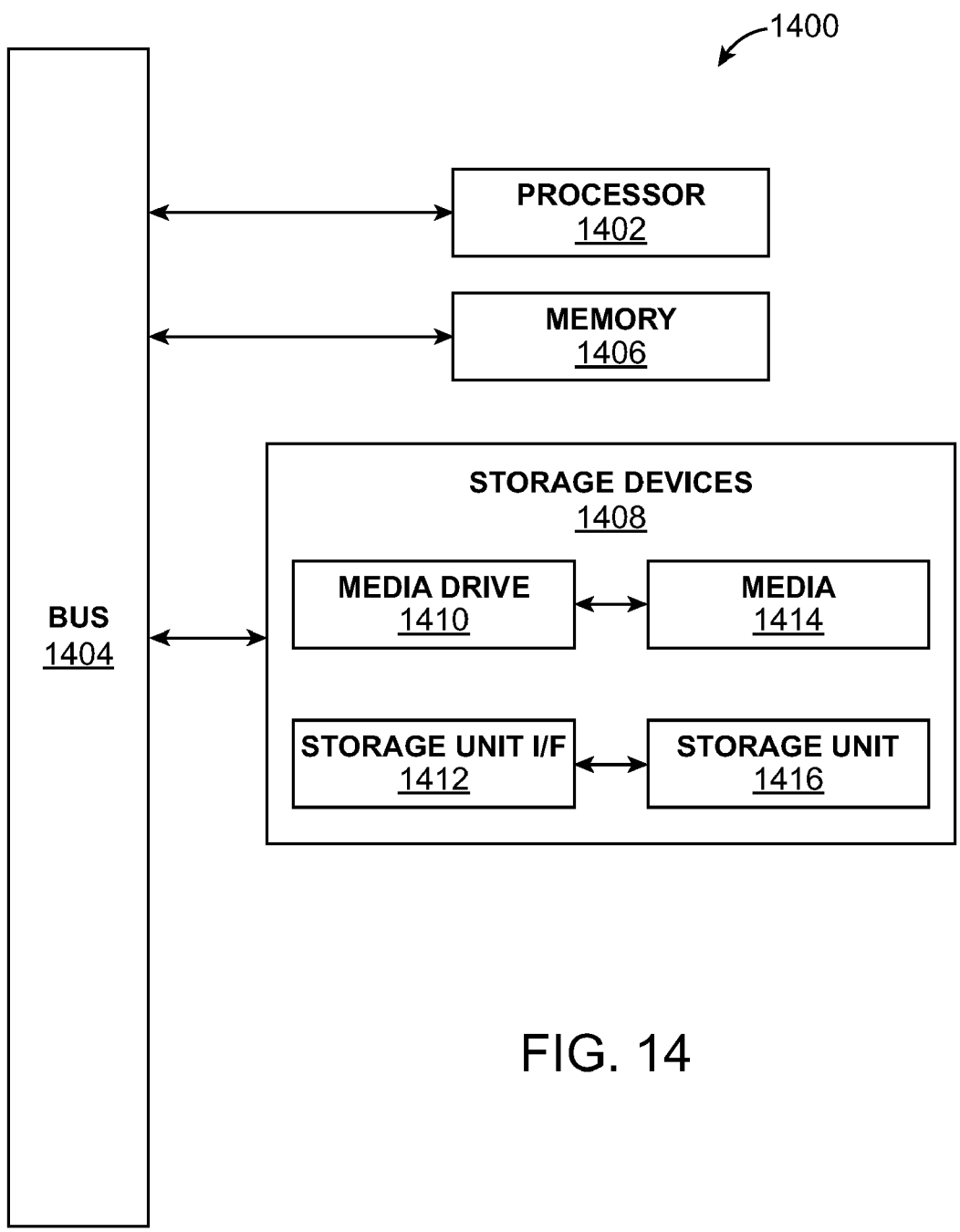
FIG. 14 is a block diagram of an illustrative computing system X00 suitable for implementing embodiments of the present invention.

FIG. 14 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface (e.g., modem or ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Operations may include providing associations between function instances of an RTL specification and power domains Operations also may include providing power source associations between a primary power domain and a secondary power domain. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing and for storing an information structure or for providing an information structure or instructions to processor 1407 for execution. Such a medium may take many forms, including but not limited to, memory devices such as non-volatile media, volatile media, and to transmission media. Non-volatile media memory devices include, for example, optical or magnetic disks, such as disk drive 1410. Volatile media memory devices include dynamic memory, such as system memory 1408. Transmission media includes coaxial cables, copper wire, and fiber optics, including wires that comprise bus 1406. Transmission media can also take the form of acoustic or light waves, such as those generated during radio wave and infrared data communications.

Common forms of computer readable media memory devices include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other physical device from which a computer can read.

In an embodiment of the invention, execution of a sequences of instructions to is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface. Received program code may be executed by processor 1407 as it is received, and/or stored in disk drive 1410, or other non-volatile storage for later execution.

The foregoing description and drawings of preferred embodiments in accordance with the present invention are merely illustrative of the principles of the invention. Various modifications can be made to the embodiments by those skilled in the art without departing from the spirit and scope of the invention, which is defined in the appended claims.

APPENDIX A

Power Related Commands and Options

The create_isolation_rule command is used to add isolation cells for certain designer-specified power domains. This command allows a designer to specify which pins are to be isolated by 1) specifying all pins to be isolated with the -pins option; 2) selecting only output pins in the power domains listed with the -from option; 3) selecting only input pins in the power domains listed with the -to option; and 4) combining options to filter the set of pins. Specifically, a designer may 1) combine -pins and -from options to isolate those pins in the designer-specified list that are also output pins in a power domain listed with the -from option; 2) combine -pins and -to options to isolate those pins in the designer-specified list that are also input pins in a power domain listed with the -to option; 3) combine -from and -to options to isolate input pins that belong to a power domain listed with the -to option but that are also driven by a net coming from a power domain listed with the -from option; 4) combine -pins, -from and -to options to isolate those input pins in the designer-specified list that belong to a power domain listed with the -to option but that are also driven by a net coming from a power domain listed with the -from option; and 5) exclude certain pins with the -exclude option. An example use of the create_isolation_rule command is shown below.

create_isolation_rule
-isolation_condition expression
{-pins pin_list|-from power_domain_list|-to power_domain_ list} . . .
[-exclude pin_list] [-location {from|to}]
[-isolation_output {high|low|hold}]
[-cells cell_list] [-prefix string]

The options and their corresponding arguments of the create_isolation_rule command are shown as follows according to an embodiment of the present invention.

-cells cell_list: This option and its argument specify the names of the library cells that are used as isolation cells for the selected pins. By default, the appropriate isolation cells are chosen from the isolation cells defined with the define_isolation_cell command or from the library cells with isolation related .lib attributes.

-exclude pin_list: This option and its argument specify a list of pins that do not require isolation logic.

-from power_domain_list: This option and its argument limit the pins to be considered for isolation to output pins in the specified power domains. If specified with -to option, all input pins in the -to domains that are receiving signals from the -from domains will be isolated. The power domains are previously defined with the create_power_domain command.

-isolation_condition expression: This option and its argument specify a condition when the specified pins should be isolated. This condition is a function of pins.

-isolation_output {high|low|hold}: This option and its argument control and generate the output value at the output of the isolation logic in response to certain isolation condition being met. The output can be high, low, or held to the value it has right before the isolation condition is activated.

-location {from|to}: This option and its argument specify the power domain to which the isolation logic is added. The from argument stores the isolation logic with the instances of the originating power domain, and the to argument stores the isolation logic with the instances of the destination power domain. The default argument is to.

-pins pin_list: This option and its argument specify a list of pins to be isolated. The designer may list input pins and output pins of power domains. The designer may further limit the pins to be isolated using the -from, -to, and -exclude options.

-prefix string: This option and argument specify the prefix to be used when creating the create_isolation_rule.

-to power_domain_list: This option and its argument limit the pins to be considered for isolation to input pins in the specified power domains. The power domains are previously defined with the create_power_domain command.

The create_level_shifter_rule command is used to add rules for adding level shifters. This command allows to specify on which pins to insert level shifters. This command allows designers to 1) specify all pins on which to insert level shifters with the -pins option; 2) select only output pins in the power domains listed with the -from option; 3) select only input pins in the power domains listed with the -to option; 4) combine options to filter the set of pins: 4a) combine -pins and -from options—only adds level shifters to those pins in the specified list that are also output pins in a power domain listed with the -from option; 4b) combine -pins and -to options—only adds level shifters to those pins in the specified list that are also input pins in a power domain listed with the -to option; 4c) combine -from and -to options—only adds level shifters to input pins that belong to a power domain listed with the -to option but that are also driven by a net coming from a power domain listed with the -from option; 4d) combine -pins, -from and -to options—only adds level shifters to those input pins in the specified list that belong to a power domain listed with the -to option but that are also driven by a net coming from a power domain listed with the -from option; 5) exclude specific pins through the -exclude option.

create_level_shifter_rule
-name string
{-pins pin_list|-from power_domain_list|-to power_domain_list} . . .
[-exclude pin_list] [-location {from|to}]
[-cells cell_list] [-prefix string]

The cells cell_list option and its argument specify the names of the library cells to be used to bridge the specified power domains. By default, the appropriate level shifter cells are chosen from the level shifter cells defined with the define_level_shifter_cell command or from the library cells with level-shifter related .lib attributes.

The exclude pin_list option specifies a list of pins that do not require level shifters.

The from power_domain_list option specifies the name of the originating (driving) power domains. The power domain must have been previously defined with the create_power_domain command.

The location {from|to} option specifies where the level shifters must be stored: from stores the level shifters with the instances of the originating power domain; to stores the level shifters with the instances of the destination power domain; Default: to The name string option specifies the name of the level shifter rule. Note: The specified string cannot contain wildcards.

The pins pin_list specifies a list of pins to be isolated. You can list input pins and output pins of power domains. You can further limit the pins to be isolated using the -from, -to, and -exclude options.

The create_mode_transition command defines how the transition between two power modes is controlled.

create_mode_transition
-name string
-from_mode power_mode -to _mode power_mode
-start_condition expression [-end_condition expression]
[-clock_pin clock_pin [-cycles number|-latency float]]

The clock_pin clock_pin specifies the name of the clock pin that controls the transition.

The end_condition expression specifies the condition that acknowledges when the power mode transition is finished.

The cycles number specifies an integer of number of clock cycles needed to complete the power transition mode.

The from_mode (-to_mode) power_mode specifies the power mode from (to) which to transition. The mode must have been previously defined with the create_power_mode.

The latency float specifies the time it takes to transition. Specify the time in the units specified by the set_time_unit command.

The name string specifies the name of the power mode transition.

The start_condition expression specifies the condition that triggers the power mode transition.

The create_power_domain command creates a power domain and specifies the instances and top-level ports that belong to this power domain. By default, an instance inherits the power domain setting from its parent hierarchical instance or design, unless that instance is associated with a specific power domain. In one power format, referred to as the CPF, power domains are associated with the design objects based on the logical hierarchy. The order in which a designer creates the power domains is irrelevant. Note that a designer can define at least two power domains for a design, and only one power domain can be the default power domain. In addition, the create_power_domain command specifies the -power_switchable_nets and -ground_switchable_nets options if the designer wants to use the CPF file as a golden constraint file throughout the entire flow from design creation until design implementation and signoff. An example use of the create_power_domain command is shown below.

create_power_domain
    -name power_domain
    {-default [-instances instance_list]
    |-instances instance_list [-boundary_ports pin_list]
    |-boundary_ports pin_list}
    [-power_switchable_nets net_list|-ground_switchable_nets net_list]
    [-shutoff_condition expression]

The options and their corresponding arguments of the create_power_domain command are shown as follows according to an embodiment of the present invention.

-boundary_ports pin_list: This option and its argument specify the list inputs and outputs that are considered part of this domain. Specifically, for inputs and outputs of the top-level design, it specifies ports. For inputs and outputs of instances of a timing model in the library, it specifies a list of the instance pins that are part of the domain. If this option is not specified with the -instances option, the power domain is considered to be a virtual power domain. A virtual domain allows a designer to describe the associations of the inputs and outputs of an existing instance block or a not-yet designed instance block with power domains.

-default: This option identifies the specified domain as the default power domain. All instances of the design that are not associated with a specific power domain belong to the default power domain. This is also the power domain that is referenced when information for calculating delays of a specific condition of a design is created.

-instances instance_list: This option and its argument specify the names of all instances that belong to the specified power domain. If this option is specified together with the -io_ports option, it indicates that for any connection between a specified port and any instance inside the power domain, no special interface logic for power management is required.

-name power_domain: This option and its argument specify a name of a power domain.

-shutoff_condition expression: This option and its argument specify a condition when a power domain is shut off. The condition is a Boolean function of the pins. In the default mode, the power domain is on.

The example below illustrates the uses of the create_power_domain command. It assumes a design with the hierarchy Top->INST1->INST2. In this example, the following two sets of CPF commands are equivalent:

a. create_power_domain -name PD1 -instances INST1
   create_power_domain -name PD2 -instances INST1.INST2
b. create_power_domain -name PD2 -instances INST1.INST2
   create_power_domain -name PD1 -instances INST1

This illustrates that the order in which the designer specifies the target domains is irrelevant. The result is that instance INST1 belongs to power domain PD1 and instance INST2 belongs to power domain PD2. The following command associates a list of instances with power domain PD2.

create_power_domain -name PD2-instances {A C I_ARM1 PAD1}

The create_state_retention_rule command is used to replace selected registers or all registers in the specified power domain with state retention flip_flops. By default, the appropriate state retention cells are chosen from the state retention cells defined with the define_state_retention_cell command or from the library based on the appropriate .lib attributes. An example use of the create_state_retention_rule command is shown below.

create_state_retention_rule
    {-power_domain power_domain|-instances instance_list}
    -restore_edge expression [-save_edge expression]
    [-clock_gating_condition expression]
    [-cell_type string]

The options and their corresponding arguments of the create_state_retention_rule command are shown as follows according to an embodiment of the present invention.

-cell_type string: This option and its argument specify the class of library cells that can be used to map designer-specified sequential elements such as flip-flops and latches. The specified string corresponds to the value of a power_gating_cell .lib attribute. If this option is not specified, the tool may automatically choose the state retention flip-flops from the library.

-clock_gating_condition expression: This option and its argument specify a condition when the clock of a state retention cell is gated so that the save or restore operation can be carried out. The condition is a function of the pins. Note that some technologies require the clock signal being stable before a save or restore operation can be carried out.

-instances instance_list: This option and its argument specify the names of the latches and flip_flops that a designer wants to replace with a state retention flip-flop. A designer may specify the names of the leaf instances. If the designer specifies the name of a hierarchical instance, all latches and flip-flops in this instance and its children that belong to the same power domain will be replaced. Note that the instances may belong to several power domains. If they belong to different power domains, the same conditions will be applied.

-power_domain power_domain: This option and its argument specify a name of a power domain containing the target flip_flops to be replaced. In this case, all flip-flops in this power domain are replaced. The power domain is previously defined with the create_power_domain command.

-restore_edge expression: This option and its argument specify a condition when the states of the sequential elements need to be restored. The expression is a function of pins. When the expression changes from false to true, the states are restored. During logical synthesis, the logic implementing the expression will be used to drive the restore pin of the state retention cells.

-save_edge expression: This option and its argument specify a condition when the states of the sequential elements need to be saved. The condition is a function of pins. When the expression changes from false to true, the states are saved. During logical synthesis, the logic implementing the expression will be used to drive the save pin of the state retention cells. The inverse of this option is the restore_edge option.

The set_array_naming_style command specifies a format for naming individual bits of instance arrays. Note that this command appears once in a CPF file. Also note that this command is not needed if the designer uses the same object names in CPF as in the design. This command is optional in a CPF file used by RTL compiler. If the designer wants to include the command in the CPF file used by RTL compiler, the specified string needs to match the value of the hdl_array_naming_style root attribute set in RTL compiler. If the CPF file is generated by RTL compiler, the string in this command will match the value of the hdl_array_naming_style root attribute in RTL compiler. An example use of the set_array_naming_style command is shown below. The string specifies the format for an individual bit of an instance array.

set_array_naming_style string

The set_hierarchy_separator command specifies the hierarchy delimiter character used in the CPF file. Note that this command appears once in the CPF file. The Character argument specifies the hierarchy delimiter character. An example use of the set_hierarchy_separator command is shown below.

set_hierarchy_separator character

The set_cpf_version command specifies the version of the format. The value argument specifies the version by using a string. An example use of the set_cpf_version command is shown below.

set_cpf_version 1.0

The set_register_naming_style command specifies the format used to print out flip-flops and latches in the netlist. Note that this command appears once in a CPF file. Also note that this command is not needed if the same object names in CPF as in the design are used. This command is optional in a CPF file used by RTL compiler. If a designer wants to include the command in the CPF file used by RTL compiler, he needs to ensure that the specified string matches the value of the hdl_reg_naming_style root attribute set in RTL compiler. If the CPF file is generated by RTL compiler, the string in this command will match the value of the hdl_reg_naming_style root attribute in RTL compiler. An example use of the set_register_naming_style is shown below. The string argument specifies the format used for flip_flops and latches in the netlist.

set_register_naming_style string

The set_scope command changes the current scope to the scope determined by the argument. Note that all objects referred to in the library cell-related CPF commands are scope insensitive, all design objects except for ground and power nets are scope sensitive, and all the expressions in the CPF design-related constraints are scope sensitive. An example use of the set_scope command is shown below.

set_scope {hier_instance [-merge_default_domains]|-top|-up}

The options and their corresponding arguments of the set_scope command are shown as follows according to an embodiment of the present invention.

-top: This option changes the scope to the top design. Note that when a hierarchical CPF file is used, the designer should avoid using this argument in a sourced CPF file. In this case, the command does not reset the scope to the scope of the module of the hierarchical instance to which the sourced CPF file applies, but to the design of the main CPF file.

-up: This option changes the scope to the immediate parent of the current scope. Note that if a designer uses this argument when the current scope is already the top design, an error message may be issued.

-hier_instance: This option changes the scope to the specified hierarchical instance. The instance is a valid hierarchical instance in the current scope.

-merge_default_domains: This option specifies whether to merge the default power domain of the current scope (when it is not the top design) with the default power domain of the top design. Note that this option may be specified in the context of hierarchical CPF. The following example further illustrates the use of the set_scope command.

set_top design A
set_scope B.C; #changes the scope to B.C
create_isolation rule -isolation_condition .enable -from PD1
the previous command ues the enable signal at the top level to create isolation
logic at the output ports of power domain PD1
set_scope -up; #changes the scope to B
set_scope -up; #changes the scope to the parent of B, which is A or the top The set_top_design command specifies the name of the design to which the power information in the CPF file applies. Note that this command usually appears once in a CPF file. If it appears multiple times, the first one applies to the top design, while the subsequent ones follow a scope change using the set_scope command. An example use of the set_top_design command is shown below.

set_top_design design

The argument design specifies the name of the design to which the power information in the CPF file applies. It specifies the name of the top module in RTL. Note that when a designer uses a hierarchical CPF file, the design name corresponds to the module name of the current scope.

The following example further illustrates the use of the set_top_design command. In this case, the commands of the CPF file of the soft block are copied directly into the CPF file of the top design. Design B corresponds to the module name of instance i_B, which is the current scope.

set_top design top_chip
create_power_domain -name PD1 -instances C
create_power_domain -name Default -default
set_scope i_B
set_top_design B
create_power_domain -name Standby -instances DRAM -io_ports {P1 P2} \
-shutoff_condition power_down
set_scope -top
create_isolation_rule-fromi_B. Standby-toPD1-isolation_conditionstdby_signal For applications that read .lib files define_isolation_cell identifies the library cells in the .lib files that can be used as isolation cells. Note: If the library contains cells that have the attribute is_isolation_cell set to true, an application might use these cells before it uses the cells identified with an define_isolation_cell command. For applications that do not read library files define_isolation_cell allows to identify the instances of isolation cells in the netlist.

define_isolation_cell
-cells cell_list [-library_set library_set]
[-always_on_pin pin_list]
[{-power_switchable LEF_power_pin|-ground_switchable LEF_ground_pin}-power LEF_power_pin -ground LEF_ground_pin]
[-valid_location {from|to}]
[-non_dedicated]
-enable pin -always_on_pins pin_list: Specifies a list of cell pins which must always be driven.
Note: A pin specified with this option, can be specified with other options as well.

-cells cell_list: Identifies the specified cells as isolation cells. Note: This is equivalent to setting the attribute is_isolation_cell to true in the Liberty library. The libraries loaded will be searched and all cells found will be identified.

-enable pin: Identifies the specified cell pin as the enable pin.

-ground LEF_ground_pin: If this option is specified with the -power_switchable option, it indicates the GROUND pin of the specified cell.
If this option is specified with the -ground_switchable option, it indicates the GROUND pin in the corresponding LEF cell to which the ground that is on during power shut-off mode is applied.

-ground_switchable LEF_power_pin: Identifies the GROUND pin in the corresponding LEF cell to which the ground that is turned off during power shut-off mode is applied.
One can only specify this option when you cut off the path from power to ground on the ground side (that is, use a footer cell).

-library_set library_set: References the library set to be used to search for the specified cells. Specify the library set name. The libraries must have been previously defined in a define_library_set command.

-non_dedicated: Allows to use specified cells as normal function cells.

-power_LEF_power_pin: If this option is specified with the -ground_switchable option, it indicates the POWER pin of the specified cell.

If this option is specified with the -power_switchable option, it indicates the POWER pin in the corresponding LEF cell to which the power that is on during power shut-off mode is applied.

-power_switchable LEF_power_pin: Identifies the POWER pin in the corresponding LEF cell to which the power that is turned off during power shut-off mode is applied.

One can only specify this option when you cut off the path from power to ground on the power side (that is, use a header cell).

-valid_location {from|to}: Specifies the location of the isolation cell. Possible values are from—indicating that the cell must be stored with the source power domain to—indicating that the cell must be stored with the destination power domain.

For applications that read .lib files define_level_shifter_cell identifies the library cells in the .lib files that can be used as level shifter cells. Note: if the library contains cells that have the attribute is_level_shifter set to true, an application might use these cells before it uses the cells identified with an define_level_shifter_cell command. For applications that do not read library files define_level_shifter_cell allows to identify the instances of level shifter cells in the netlist.

define_level_shifter_cell
-cells cell_list [-library_set library_set]
[-always_on_pin pin_list]
-input_voltage_range {voltage|voltage_range}
-output_voltage_range {voltage|voltage_range}
[-direction {up|down|bidir}]
[-output_voltage_input_pin pin]
{-input_power_pin LEF_power_pin [-output_power_pin LEF_power_pin]
|[-input_power_pin LEF_power_pin]-output_power_pin LEF_power_pin}
-ground LEF_ground_pin
[-valid_location {from|to}]
-always_on_pins pin_list: Specifies a list of cell pins which must always be driven.

Note: A pin specified with this option, can be specified with other options as well.

-cells cell_list: Identifies the specified cell as a level shifter. Note: This is equivalent to setting the attribute is_level_shifter to true in the Liberty library.

The libraries loaded will be searched and all cells found will be used.

-direction {up|down|bidir}: Specifies whether the level shifter can be used between a lower and higher voltage, or vice versa.

Default: up

-ground LEF_ground_pin: Identifies the name of the GROUND pin in the corresponding LEF cell.

-input_power_pin LEF_power_pin: Identifies the name of the POWER pin in the corresponding LEF cell that must be connected to the power net to which the voltage of the source power domain is applied.

-input_voltage_range {voltage|voltage_range}: Identifies either a single input voltage or a range for the input (source) voltage that can be handled by this level shifter.

The voltage range must be specified as follows:

lower_bound:upper_bound:step: Specify the lower bound, upper bound and voltage increment step, respectively.

-library_set library_set: References the library set to be used to search for the specified cells. Specify the library set name. The libraries must have been previously defined in a define library set command.

-output_power_pin LEF_power_pin: Identifies the name of the POWER pin in the corresponding LEF cell that must be connected to the power net to which the voltage of the destination power domain is applied.

-output_voltage_input_pin pin: Identifies the input pin that drives a gate inside the level shifter cell that is powered by the power supply connected to the pin identified by the -output_power_pin option.

By default, the gates (inside the level shifter cell) driven by the input pins, are assumed to be powered by the power supply connected to the pin identified by the -input_power_pin option.

Note: If the cell is also listed in the define_isolation_cell command, this pin is the enable pin of the isolation cell.

-output_voltage_range {voltage|voltage_range}: Identifies either a single output voltage or a range for the output (source) voltage that can be handled by this level shifter.

The voltage range must be specified as follows:

lower_bound:upper_bound:step

Specify the lower bound, upper bound and voltage increment step, respectively.

-valid_location {from|to}: Specifies the location of the level shifter cell. Possible values are:

from—indicating that the cell must be stored with the source power domain;

to—indicating that the cell must be stored with the destination power domain.

Default: to

For applications that read .lib files define_power_switch_cell identifies the library cells in the .lib files that can be used as power switch cells. For applications that do not read library files define_power_switch_cell allows to identify the instances of power switch cells in the netlist. Note: This command is required if you use the create_power_switch_rule command.

define_power_switch_cell
-cells cell_list [-library_set library_set]
-stage_1_enable expression [-stage_1_output expression]
[-stage_2_enable expression [-stage_2_output expression]]
-type {footer|header}
[-power_switchable LEF_power_pin -power LEF_power_pin
|-ground_switchable LEF_ground_pin -ground LEF_ground_pin]
[-on_resistance float]
[-stage_1_saturation_current float]
[-stage_2_saturation_current float]
[-leakage_current float]
-cells cell_list: Identifies the specified cells as power switch cells.

-ground LEF_ground_pin: Identifies the input ground pin of the corresponding LEF cell.

One can only specify this option when you cut off the path from power to ground on the ground side (that is, use a footer cell).

-ground_switchable LEF_ground_pin: Identifies the output ground pin in the corresponding LEF cell that must be connected to a switchable ground net.

-leakage_current float: Specifies the leakage current when the power switch is turned off. Specify the current in ampere (A).

-library_set library_set: References the library set to be used to search for the specified cells. Specify the library set name. The libraries must have been previously defined in a define_library_set command.

-on_resistance float: Specifies the resistance of the power switch when the power switch is turned on. Specify the resistance in ohm.

-power LEF_power_pin: Identifies the input POWER pin of the corresponding LEF cell.

You can only specify this option when you cut off the path from power to ground on the power side (that is, use a header cell).

-power_switchable LEF_power_pin: Identifies the output power pin in the corresponding LEF cell that must be connected to a switchable power net.

One can only specify this option when you cut off the path from power to ground on the power side (that is, use a header cell).

-stage_1_saturation_current (-stage_2_saturation_current) float: Specifies the Id saturation current of the MOS transistor in the specified stage. Specify the current in ampere (A).

The saturation current—which can be found in the SPICE model—limits the maximum current that a power switch can support.

-stage_1_enable (-stage_2_enable) expression: Specifies when the transistor driven by this input pin is turned on (enabled) or off.

The switch is turned on when the expression evaluates to true. The expression is a function of the input pin.

-stage_1_output (-stage_2_output) expression: Specifies whether the output pin specified in the expression is the buffered or inverted output of the input pin specified through the corresponding -stage_x_enable option.

The pin specified through the -acknowledge_receiver option of the create_power_switch_rule command is connected to the output pin specified through:

The -stage_1_output option if the -stage_2_output option is omitted;

The -stage_2_output option if both -stage_1_output and stage_2_output options are specified.

Note: If neither option is specified, the pin specified through the -acknowledge_receiver is left unconnected.

-type {header|footer}: Specifies whether the power switch cell is a header or footer cell.

For applications that read .lib files define_state_retention_cell identifies the library cells in the .lib files that can be used as state retention cells. Note: If the library contains cells that have the attribute power_gating_cell set to true, an application might use these cells before it uses the cells identified with an define_state_retention_cell command. For applications that do not read library files define_state_retention_cell allows to identify the instances of state retention cells in the netlist. Note: This command is required for any application that does not read .lib files.

define_state_retention_cell
-cells cell_list [-library_set library_set]
[-always_on_pin pin_list]
[-clock_pin pin]
-restore_function expression [-restore_check expression]
[-save_function expression] [-save_check expression]
[{-power_switchable LEF_power_pin|-ground_switchable LEF_ground_pin}
-power LEF_power_pin -ground LEF_ground_pin]
-always_on_pins pin_list: Specifies a list of cell pins which must always be driven.

Note: A pin specified with this option, can be specified with other options as well.

-cells cell_list: Identifies the specified cells as state retention cells.

Note: This is equivalent to setting the attribute power_gating_cell to true in the Liberty library.

The libraries loaded will be searched and all cells found will be used.

-clock_pin pin: Specifies the clock pin.

-ground LEF_ground_pin: If this option is specified with the -power_switchable option, it specifies the GROUND pin of the corresponding LEF cell.

If this option is specified with the -ground_switchable option, it indicates the GROUND pin in the corresponding LEF cell to which the ground net that is on during power shut-off mode is connected.

-ground_switchable LEF_power_pin: Identifies the GROUND pin in the corresponding LEF cell to which the ground that is turned off during power shut-off mode is applied.

One can only specify this option when you cut off the path from power to ground on the ground side (that is, use a footer cell).

-library_set library_set: References the library set to be used to search for the specified cells. Specify the library set name. The libraries must have been previously defined in a define_library_set command.

-power LEF_power_pin: If this option is specified with the -ground_switchable option, it indicates the POWER pin of the specified cell.

If this option is specified with the -power_switchable option, it indicates the POWER pin to which the power that is always on during shut-off mode is applied.

-power_switchable LEF_power_pin: Identifies the POWER pin in the corresponding LEF cell to which the power that is turned off during power shut-off mode is applied.

One can only specify this option when you cut off the path from power to ground on the power side (that is, use a header cell).

-restore_check expression: Specifies the additional condition when the states of the sequential elements can be restored. The expression can be a function of the clock pin and the restore pin. The expression must be true when the restore event occurs.

Note: If one wants to use the clock pin in the expression, you must have identified the clock pin with the -clock_pin option.

-restore_function expression: Specifies the polarity of the restore pin that enables the retention cell to restore the saved value after exiting power shut-off mode.

Note: Expression is limited to the pin name and the inversion of the pin name. An expression containing only the pin name indicates an active high polarity. An expression containing the inversion of the pin name indicates an active low polarity.

-save_check expression: Specifies the additional condition when the states of the sequential elements can be saved. The expression can be a function of the clock pin and the save pin The expression must be true when the save event occurs.

Note: If one wants to use the clock pin in the expression, you must have identified the clock pin with the -clock_pin option.

-save_function expression: Specifies the polarity of the save pin that enables the retention cell to save the current value before entering power shut-off mode.

If not specified, the save event is triggered by the opposite of the expression specified for the restore event.

Note: Expression is limited to the pin name and the inversion of the pin name. An expression containing only the pin name indicates an active high polarity. An expression containing the inversion of the pin name indicates an active low polarity.

The invention claimed is:

1. A method to produce an information structure in a computer readable memory device, wherein the information structure specifies power source hierarchy information for Register Transistor Level (RTL) an RTL circuit design that includes multiple function instances encoded in computer readable memory, comprising:

specifying in the memory device a primary power domain that includes respective function instances of the RTL design;

specifying in the memory device a power control related behavior (PCB) to include within the primary power domain;
specifying in the memory device a secondary power domain; and
providing an association within the memory device between the primary power domain and the secondary power domain, by using a computer;
wherein the association is indicative to one or more electronic design automation tools, of a hierarchical power source relationship in which the secondary power domain serves as a switched power source for the function instances included in the associated primary power domain and in which the secondary power domain serves as an unswitched power source for the PCB included in the associated primary power domain;
wherein the association does not indicate to the electronic design automation tool whether the switched power source uses power net switching or ground net switching; and
wherein the association is used in the computer system by the one or more design tools in one or more of design simulation or design verification of both functional behavior and power control behavior of a design having the hierarchical power source relationship and to derive a physical level design at one or more stages of the circuit design.

2. The method of claim 1,
wherein the secondary power domain also is a respective primary power domain.

3. The method of claim 1,
wherein the power control behavior includes an isolation behavior.

4. The method of claim 1,
wherein the power control behavior includes a state retention behavior.

5. The method of claim 1,
wherein the power control behavior includes an always on behavior.

6. The method of claim 1, further including:
specifying in the memory device a first power net and a first ground net;
providing an association in the memory device between the primary power domain and the first power net and the first ground net;
specifying in the memory device a second power net and a second ground net;
providing association in the memory device an association between the secondary power domain and the second power net and the second ground net; and
specifying in the memory device a power gating switch between at least one or the other of the first power net and the second power net or the first ground net and the second ground net.

7. The method of claim 6, further including:
specifying in the memory device a power source relationship, that is not gated by the power switch, between the power control behavior, which is included in the primary power domain, and the secondary power domain.

8. The method of claim 1 further including:
specifying in the memory device an extension to the association that indicates a power net and a ground net associated with the secondary power domain;
specifying in the memory device one of a power net switch or a ground net switch to implement power switching by the power switched source in a physical implementation of the circuit design.

9. The method of claim 1,
wherein specifying in the memory device one of a power net switch or a ground net switch includes automatically specifying one or the other as a default selection.

10. An article of manufacture including a computer readable memory device encoded with an information produced according to a method comprising:
specifying in the memory device a primary power domain that includes respective function instances of an Register Transistor Level (RTL) circuit design;
specifying in the memory device a power control related behavior (PCB) to include within the primary power domain;
specifying in the memory device a secondary power domain; and
providing an association within the memory device between the primary power domain and the secondary power domain, by using a computer;
wherein the association is indicative to one or more electronic design automation tools, of a hierarchical power source relationship in which the secondary power domain serves as a switched power source for the function instances included in the associated primary power domain and in which the secondary power domain serves as an unswitched power source for the PCB included in the associated primary power domain;
wherein the association does not indicate to the electronic design automation tool whether the switched power source uses power net switching or ground net switching; and
wherein the association is used in the computer system by the one or more design tools in one or more of design simulation or design verification of both functional behavior and power control behavior of a design having the hierarchical power source relationship and to derive a physical level design at one or more stages of the circuit design.

11. The article of manufacture of claim 10,
wherein the secondary power domain also is a respective primary power domain.

12. The article of manufacture of claim 10,
wherein the power control behavior includes an isolation behavior.

13. The article of manufacture of claim 10,
wherein the power control behavior includes a state retention behavior.

14. The article of manufacture of claim 10,
wherein the power control behavior includes an always on behavior.

15. The article of manufacture of claim 10 further including:
specifying in the memory device an extension to the association that indicates a power net and a ground net associated with the secondary power domain;
specifying in the memory device one of a power net switch or a ground net switch to implement power switching by the power switched source in a physical implementation of the circuit design.

16. The article of manufacture of claim 10,
wherein specifying in the memory device one of a power net switch or a ground net switch includes automatically specifying one or the other as a default selection.

* * * * *

UNITED STATES PATENT AND TRADEMARK OFFICE
CERTIFICATE OF CORRECTION

PATENT NO. : 7,954,078 B1  
APPLICATION NO. : 11/771953  
DATED : May 31, 2011  
INVENTOR(S) : Qi Wang et al.

Page 1 of 1

It is certified that error appears in the above-identified patent and that said Letters Patent is hereby corrected as shown below:

In column 12, line 49, after "708" delete "relationship 706".

In column 15, line 26, after "10)" insert -- . --.

In column 27, line 49, delete "ues" and insert -- use --, therefor.

Signed and Sealed this
Sixteenth Day of August, 2011

David J. Kappos
*Director of the United States Patent and Trademark Office*